United States Patent
Zhang

(10) Patent No.: US 11,284,355 B2
(45) Date of Patent: Mar. 22, 2022

(54) INTERFERENCE MEASUREMENT METHOD AND RELATED DEVICE

(71) Applicant: HUAWEI TECHNOLOGIES CO., LTD., Shenzhen (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/496,490

(22) PCT Filed: May 5, 2017

(86) PCT No.: PCT/CN2017/083151
§ 371 (c)(1),
(2) Date: Sep. 23, 2019

(87) PCT Pub. No.: WO2018/171006
PCT Pub. Date: Sep. 27, 2018

(65) Prior Publication Data
US 2021/0112503 A1 Apr. 15, 2021

(30) Foreign Application Priority Data

Mar. 24, 2017 (CN) .......................... 201710182073.0

(51) Int. Cl.
*H04W 52/24* (2009.01)
*H04B 17/345* (2015.01)
*H04W 24/08* (2009.01)

(52) U.S. Cl.
CPC ........ *H04W 52/243* (2013.01); *H04B 17/345* (2015.01); *H04W 24/08* (2013.01)

(58) Field of Classification Search
CPC . H04W 52/243; H04W 52/244; H04B 17/345
See application file for complete search history.

(56) References Cited

U.S. PATENT DOCUMENTS 9,253,731 B2  2/2016  Parkvall et al.
9,253,780 B2  2/2016  Goldhamer
(Continued)

FOREIGN PATENT DOCUMENTS

CN   101697628 A   4/2010
CN   102378190 A   3/2012
(Continued)

OTHER PUBLICATIONS

Zte et al,"Overview of Duplexing and Cross-link Interference Mitigation", 3GPP TSG RAN WG1 Meeting#88, R1-1701613, Athens, Greece, Feb. 13, 2017, total 12 pages.
(Continued)

*Primary Examiner* — Hoon J Chung
(74) *Attorney, Agent, or Firm* — Rimon PC

(57) ABSTRACT

This application provides an interference measurement method. A first terminal sends an interference measurement signal on an interference measurement resource, where the interference measurement signal is a signal used to measure interference between links in different directions, and the different directions include a downlink direction between the first terminal and a first network device and an uplink direction between a second terminal and a second network device; and the second terminal monitors interference measurement signal strength based on information about the interference measurement resource and information about the interference measurement signal. The second terminal may further perform power control based on interference measurement, that is, control, based on the interference measurement signal strength, power at which the second terminal sends a data signal to the second network device. In addition, this application further provides a device related to interference measurement, to ensure actual application and implementation of the foregoing method.

20 Claims, 9 Drawing Sheets

(56) References Cited

U.S. PATENT DOCUMENTS

| | | | |
|---|---|---|---|
| 9,516,611 | B2 | 12/2016 | Kim et al. |
| 10,009,903 | B2 | 6/2018 | Kim et al. |
| 2010/0284355 | A1 | 11/2010 | Jung et al. |
| 2011/0286346 | A1 | 11/2011 | Barbieri et al. |
| 2014/0219113 | A1 | 8/2014 | Li et al. |
| 2014/0321313 | A1* | 10/2014 | Seo .................. H04J 11/0056 370/252 |
| 2014/0341089 | A1 | 11/2014 | Ji et al. |
| 2015/0139105 | A1 | 5/2015 | Guo et al. |
| 2015/0256320 | A1 | 9/2015 | Feng et al. |
| 2016/0020893 | A1 | 1/2016 | Tong et al. |
| 2017/0034837 | A1 | 2/2017 | Lopez-Perez et al. |
| 2017/0257177 | A1 | 9/2017 | Noh et al. |
| 2018/0337756 | A1* | 11/2018 | Nam .................. H04L 5/0051 |

FOREIGN PATENT DOCUMENTS

| | | |
|---|---|---|
| CN | 102845096 A | 12/2012 |
| CN | 102892121 A | 1/2013 |
| CN | 104284361 A | 1/2015 |
| CN | 104956716 A | 9/2015 |
| CN | 105025519 A | 11/2015 |
| CN | 106165518 A | 11/2016 |
| EP | 2763480 A1 | 8/2014 |
| EP | 2793414 A1 | 10/2014 |
| EP | 2923510 B1 | 1/2018 |
| GB | 2420255 A | 5/2006 |
| JP | 2016518780 A | 6/2016 |
| JP | 2017511987 A | 4/2017 |
| KR | 20090060951 A | 6/2009 |
| KR | 20100112329 A | 10/2010 |
| KR | 20140123486 A | 10/2014 |
| RU | 2013139299 A | 2/2015 |
| RU | 2576671 C2 | 3/2016 |
| RU | 2582598 C2 | 4/2016 |
| WO | 2009075518 A2 | 6/2009 |
| WO | 2013167807 A1 | 11/2013 |
| WO | 2014079052 A1 | 5/2014 |
| WO | 2015103733 A1 | 7/2015 |
| WO | 2015126028 A1 | 8/2015 |
| WO | 2016060466 A1 | 4/2016 |

OTHER PUBLICATIONS

Samsung, "Cross-link interference management based on power control", 3GPP TSG RAN WG1 Meeting #89, R1-1708059, Hangzhou, P.R. China May 15, 2017, total 4 pages.

Huawei et al, "UL Power control for cross-link interference mitigation", 3GPP TSG RAN WG1 NR Ad Hoc Meeting, R1-1709983, Qingdao, China, Jun. 27, 2017, total 6 pages.

Huawei et al, "Discussion on TRP to TRP interference mitigation schemes", 3GPP TSG RAN WG 1 Meeting 86BIS, R1-1608830, Lisbon, Portugal, Oct. 10, 2016, total 4 pages.

Huawei et al, "Discussion on UE-to-UE interference mitigation schemes", 3GPP TSG RAN WG1 Meeting #86bis, R1-1608831, Lisbon, Portugal, Oct. 10, 2016, total 3 pages.

3GPP TS 36.211 V14.2.0 (Mar. 2017), 3rd Generation Partnership Project;Technical Specification Group Radio Access Network,Evolved Universal Terrestrial Radio Access (E-UTRA);Physical channels and modulation(Release 14),dated Mar. 23, 2017,total 196 pages.

Huawei, HiSilicon, General discussion on flexible duplex, 3GPP TSG RAN WG1 Meeting #86bis, R1-1609421, Lisbon, Portugal, Oct. 10-14, 2016, 5 pages.

MediaTek Inc., Dynamic TDD performance evaluation, 3GPP TSG RAN WG1 Meeting #88, R1-1703770, Athens, Greece, Feb. 13-17, 2017, 4 pages.

* cited by examiner

INTERFERENCE MEASUREMENT METHOD AND RELATED DEVICE

CROSS-REFERENCE TO RELATED APPLICATIONS

This application is a national stage of the International application No. PCT/CN2017/083151, filed on May 5, 2017, which claims priority to Chinese Patent Application No. 201710182073.0, filed on Mar. 24, 2017. Both of the aforementioned applications are hereby incorporated by reference in their entireties.

This application claims priority to Chinese Patent Application No. 201710182073.0, filed with the Chinese Patent Office on Mar. 24, 2017 and entitled "NETWORK RESOURCE CONFIGURATION METHOD AND DEVICE", which is incorporated herein by reference in its entirety.

TECHNICAL FIELD

This application relates to the field of communications technologies, and more specifically, to an interference measurement method and a related device.

BACKGROUND

As asymmetric uplink-downlink services in a communications system increase and an uplink-downlink service ratio continuously changes, use of fixed frequency spectrums in pairs and a fixed uplink-downlink slot configuration can no longer effectively support a dynamically asymmetric characteristic of a service. In flexible duplex, uplink and downlink resources can be adaptively allocated based on distribution of uplink and downlink services. This can effectively improve utilization of resources in the communications system, and therefore can meet a requirement of a future network for an asymmetry characteristic.

One duplex mode in a flexible duplex technology is a flexible frequency band technology in which some uplink frequency bands in a frequency division duplex (Frequency Division Duplex, FDD) system are configured as flexible frequency bands. During actual application, flexible frequency bands are allocated for uplink transmission or downlink transmission based on distribution of uplink and downlink services in a network, so that uplink and downlink spectrum resources match uplink and downlink service requirements, thereby improving spectrum utilization. For example, when a downlink service volume is higher than an uplink service volume in a network, a frequency band that is originally used for uplink transmission in the network may be configured as a frequency band used for downlink transmission.

Another duplex mode in the flexible duplex technology is a flexible time division technology. In other words, time division duplex (Time Division Duplex, TDD) on a frequency band is used to transmit uplink and downlink services. In a long term evolution (Long Term Evolution, LTE) system, there are a total of seven different subframe configuration modes in TDD uplink-downlink configurations. When different TDD configurations are used in neighboring cells, or when some uplink (Uplink, UL) frequency bands are configured as downlink (Downlink, DL) frequency bands based on a service requirement in FDD flexible duplex, cross-link interference, to be specific, interference between links in different directions, may be caused between neighboring cells on a same time domain/frequency domain resource.

SUMMARY

In view of this, this application provides an interference measurement method, to measure cross-link interference existing between neighboring cells, to be specific, interference between links in different directions, and further perform power control based on the measured interference.

To achieve the objectives, this application provides the following technical solutions.

According to a first aspect, this application provides an interference measurement method, including: sending, by a first terminal, an interference measurement signal on an interference measurement resource, where the interference measurement signal is a signal used to measure interference between links in different directions, and the different directions include a downlink direction between the first terminal and a first network device and an uplink direction between a second terminal and a second network device; measuring, by the second terminal, the interference measurement signal based on information about the interference measurement resource and information about the interference measurement signal, to obtain interference measurement signal strength; and controlling, by the second terminal based on the interference measurement signal strength, power at which the second terminal sends a data signal to the second network device.

In an example, the sending, by a first terminal, an interference measurement signal on an interference measurement resource includes: receiving, by the first terminal, indication information of the interference measurement resource and/or indication information of the interference measurement signal, where the indication information of the interference measurement resource includes at least one of a time domain location, a frequency domain location, and a space domain location for transmitting the interference measurement signal; and sending, by first terminal on the interference measurement resource indicated by the indication information of the interference measurement resource, the interference measurement signal indicated by the indication information of the interference measurement signal.

In an example, the receiving, by the first terminal, indication information of the interference measurement resource and/or indication information of the interference measurement signal includes: receiving, by the first terminal, the indication information, sent by the first network device or the second network device, of the interference measurement resource; and receiving, by the first terminal, the indication information, sent by the first network device or the second network device, of the interference measurement signal.

In an example, the receiving, by the first terminal, indication information of the interference measurement resource and/or indication information of the interference measurement signal includes: configuring the indication information of the interference measurement resource and/or the indication information of the interference measurement signal for the first terminal through OAM.

In an example, the time domain location includes a subframe, a slot, a mini-subframe, a mini-slot, an OFDM symbol, or a resource unit fewer than one OFDM symbol.

In an example, the frequency domain location includes a frequency band, a subband, a frequency offset, a control channel element, or a physical resource block.

In an example, the space domain location includes information about a transmission port or a transmission beam, and the information about the transmission beam is an identifier related to the beam.

In an example, the time domain location is located in any one of the following subframes: a subframe including a PDCCH, a PDSCH, and a PUCCH, a subframe including a PDCCH, a PUSCH, and a PUCCH, a subframe including a PDCCH and a PDSCH, and a subframe including a PUCCH and a PUSCH.

In an example, if the time domain location is located in the subframe including the PDCCH, the PUSCH, and the PUCCH, the interference measurement resource is one or more OFDM symbols after the PDCCH; or if the time domain location is located in the subframe including the PDCCH, the PDSCH, and the PUCCH, the interference measurement resource is one or more OFDM symbols before the PUCCH.

In an example, the interference measurement signal is a demodulation reference signal, a channel state information-reference signal, a sounding reference signal, a preamble, or a new signal.

In an example, the indication information of the interference measurement signal includes at least one of the following: a sequence length, a cyclic shift, a physical cell identifier, and a pseudo-random sequence initial value.

In an example, the indication information of the interference measurement signal further includes a transmission port or a transmission beam for the interference measurement signal, and the transmission beam is an identifier related to the beam.

In an example, the identifier related to the beam includes a time domain identifier of a synchronization signal resource block, a time domain identifier of a synchronization signal, or an identifier of a reference signal.

In an example, the controlling, by the second terminal based on the interference measurement signal strength, power at which the second terminal sends a data signal to the second network device includes: receiving, by the second terminal, a relationship between a characteristic of the interference measurement signal and a location of the data signal, where the location includes at least one of a time domain location, a frequency domain location, and a space domain location; determining, by the second terminal, the characteristic of the interference measurement signal sent by the first terminal, and determining, based on the relationship, the location of the data signal corresponding to the interference measurement signal sent by the first terminal; and controlling, by the second terminal based on the interference measurement signal strength, the second terminal to control the sending power of the data signal at the determined location.

In an example, the receiving, by the second terminal, a relationship between a characteristic of the interference measurement signal and a location of the data signal includes: receiving, by the second terminal, the relationship that is between the characteristic of the interference measurement signal and the location of the data signal and that is sent by first network device or the second network device.

In an example, the receiving, by the second terminal, a relationship between a characteristic of the interference measurement signal and a location of the data signal includes: configuring the relationship between the characteristic of the interference measurement signal and the location of the data signal for the second terminal through OAM.

In an example, any one of the indication information of the interference measurement resource, the indication information of the interference measurement signal, and the relationship between the characteristic of the interference measurement signal and the location of the data signal is sent by using at least one of RRC signaling, MAC layer signaling, or physical layer signaling.

In an example, any one of the indication information of the interference measurement resource, the indication information of the interference measurement signal, and the relationship between the characteristic of the interference measurement signal and the location of the data signal is preconfigured by using RRC signaling, and is activated or deactivated by using physical layer signaling.

In an example, when the first terminal sends the interference measurement signal on the interference measurement resource, the interference measurement resource and/or the interference measurement signal is orthogonal in time domain, orthogonal in frequency domain, or orthogonal in code domain.

In an example, the interference measurement signal strength obtained by the second terminal through measurement includes any one or more of the following: reference signal received power, reference signal received quality, a received signal strength indicator, a channel quality indicator, and a channel state indicator.

In an example, the controlling, by the second terminal based on the interference measurement signal strength, power at which the second terminal sends a data signal to the second network device includes: determining, by the second terminal, an uplink modulation and coding scheme to the second network device based on a correspondence between the interference measurement signal strength and the uplink modulation and coding scheme; or determining, by the second terminal, uplink transmit power to the second network device based on a correspondence between the interference measurement signal strength and a transmit power control parameter.

In an example, the second terminal receives signaling sent by the second network device, and the signaling includes the correspondence between the interference measurement signal strength and the uplink modulation and coding scheme and/or the correspondence between the interference measurement signal strength and the transmit power control parameter.

In an example, the signaling is at least one of radio resource control signaling, MAC layer signaling, or physical layer signaling.

In an example, the physical layer signaling is uplink grant signaling or signaling in downlink control information.

In an example, the transmit power control parameter includes any one or more of the following: a target power value, a path loss compensation factor, a closed-loop transmit power value, and a cross-link interference parameter.

In an example, when interference measurement is mid-term or a long-term interference measurement, the cross-link interference parameter is sent by the second network device to the second terminal by using higher layer signaling; or when interference measurement is short-term interference measurement, the cross-link interference parameter is sent by the second network device to the second terminal by using MAC layer signaling or physical layer signaling.

In an example, the correspondence between the interference measurement signal strength and the uplink modulation and coding scheme includes a correspondence between an interference measurement signal strength level and the uplink modulation and coding scheme.

In an example, the correspondence between the interference measurement signal strength and the transmit power control parameter includes a correspondence between an interference measurement signal strength level and the transmit power control parameter.

In an example, the strength level is determined based on a signal strength threshold.

According to a second aspect, this application provides an interference measurement method, including:

a. sending, by a second terminal, an interference measurement signal on an interference measurement resource, where the interference measurement signal is a signal used to measure interference between links in different directions, and the different directions include a downlink direction between a first terminal and a first network device and an uplink direction between the second terminal and a second network device; and measuring, by the first terminal, the interference measurement signal based on information about the interference measurement resource and information about the interference measurement signal, to obtain interference measurement signal strength.

In an example, the interference measurement method further includes: sending, by the first terminal, the interference measurement signal strength to the first network device.

In an example, the interference measurement method further includes: controlling, by the first network device based on the interference measurement signal strength, power at which the first network device sends a data signal to the first terminal.

In an example, a type of the interference measurement signal strength obtained by the first terminal through measurement includes any one or more of the following: reference signal received power, reference signal received quality, a received signal strength indicator, a channel quality indicator, and a channel state indicator.

In an example, the interference measurement method further includes: establishing, by the first terminal, an association relationship between the type of the interference measurement signal strength and an uplink direction.

In an example, the interference measurement method further includes: sending, by the first terminal, the association relationship between the type of the interference measurement signal strength and the uplink direction to the first network device.

In an example, the sending, by the first terminal, the association relationship between the type of the interference measurement signal strength and the uplink direction to the first network device includes: sending, by the first terminal, the association relationship between the type of the interference measurement signal strength and the uplink direction to the first network device by using either of the following two resources, where the resources include a reserved resource located in a PUCCH in a subframe including a PDCCH, a PDSCH, and the PUCCH and a reserved resource located in a PUSCH or a PUCCH in a subframe including a PDCCH, the PUSCH, and the PUCCH.

In an example, the sending, by the first terminal, the interference measurement signal strength to the first network device includes: sending, by the first terminal, the interference measurement signal strength to the first network device by using either of the following two resources, where the resources include a reserved resource located in a PUCCH in a subframe including a PDCCH, a PDSCH, and the PUCCH and a reserved resource located in a PUSCH or a PUCCH in a subframe including a PDCCH, the PUSCH, and the PUCCH.

In an example, the reserved resource is included in at least one of RRC signaling, MAC layer signaling, and physical layer signaling that are sent by the first network device.

According to a third aspect, this application provides an interference measurement method, including: sending, by a first network device, an interference measurement signal to a second network device on an interference measurement resource, where the interference measurement signal is a signal used to measure interference between links in different directions; and measuring, by the second network device, the interference measurement signal based on information about the interference measurement resource and information about the interference measurement signal, to obtain interference measurement signal strength.

In an example, the interference measurement method further includes: sending, by the second network device, the interference measurement signal strength to the first network device.

In an example, the interference measurement method further includes: sending, by the first network device, indication information of the interference measurement resource and/or indication information of the interference measurement signal to a first terminal, so that the first terminal performs a rate matching or data puncturing operation on received data based on the indication information.

In an example, the interference measurement method further includes: sending, by the second network device, indication information of the interference measurement resource and/or indication information of the interference measurement signal to a second terminal, so that the second terminal performs a rate matching or data puncturing operation on uplink transmitted data based on the indication information.

In an example, the indication information of the interference measurement resource and/or the indication information of the interference measurement signal are/is sent by using at least one of RRC signaling, MAC layer signaling, and physical layer signaling.

According to a fourth aspect, this application provides a terminal, including: a receiver, configured to receive indication information of an interference measurement resource and/or indication information of an interference measurement signal, where the indication information of the interference measurement resource includes at least one of a time domain location, a frequency domain location, and a space domain location for transmitting the interference measurement signal; and a transmitter, configured to send, on the interference measurement resource indicated by the indication information of the interference measurement resource, the interference measurement signal indicated by the indication information of the interference measurement signal, where the interference measurement signal is a signal used to measure interference between links in different directions.

In an example, that the receiver is configured to receive the indication information of the interference measurement resource and/or the indication information of the interference measurement signal includes: the receiver is specifically configured to: receive the indication information, sent by a first network device or a second network device, of the interference measurement resource; and receive the indication information, sent by the first network device or the second network device, of the interference measurement signal.

In an example, that the receiver is configured to receive the indication information of the interference measurement resource and/or the indication information of the interference measurement signal includes: the receiver is specifically configured to receive the indication information of the interference measurement resource and/or the indication information of the interference measurement signal that are/is configured for the first terminal through OAM.

In an example, the time domain location includes a subframe, a slot, a mini-subframe, a mini-slot, an OFDM symbol, or a resource unit fewer than one OFDM symbol.

In an example, the frequency domain location includes a frequency band, a subband, a frequency offset, a control channel element, or a physical resource block.

In an example, the space domain location includes information about a transmission port or a transmission beam, and the information about the transmission beam is an identifier related to the beam.

In an example, the time domain location is located in any one of the following subframes: a subframe including a PDCCH, a PDSCH, and a PUCCH, a subframe including a PDCCH, a PUSCH, and a PUCCH, a subframe including a PDCCH and a PDSCH, and a subframe including a PUCCH and a PUSCH.

In an example, if the time domain location is located in the subframe including the PDCCH, the PUSCH, and the PUCCH, the interference measurement resource is one or more OFDM symbols after the PDCCH; or if the time domain location is located in the subframe including the PDCCH, the PDSCH, and the PUCCH, the interference measurement resource is one or more OFDM symbols before the PUCCH.

In an example, the interference measurement signal is a demodulation reference signal, a channel state information-reference signal, a sounding reference signal, a preamble, or a new signal.

In an example, the indication information of the interference measurement signal includes at least one of the following: a sequence length, a cyclic shift, a physical cell identifier, and a pseudo-random sequence initial value.

In an example, the indication information of the interference measurement signal further includes a transmission port or a transmission beam for the interference measurement signal, and the transmission beam is an identifier related to the beam.

In an example, the identifier related to the beam includes a time domain identifier of a synchronization signal resource block, a time domain identifier of a synchronization signal, or an identifier of a reference signal.

In an example, that the receiver is configured to receive the indication information of the interference measurement resource and/or the indication information of the interference measurement signal includes: the receiver is specifically configured to receive at least one of RRC signaling, MAC layer signaling, or physical layer signaling, where the signaling includes the indication information of the interference measurement resource and/or the indication information of the interference measurement signal.

In an example, that the receiver is configured to receive the indication information of the interference measurement resource and/or the indication information of the interference measurement signal includes: the receiver is specifically configured to receive RRC signaling, where the RRC signaling is used to preconfigure the indication information of the interference measurement resource and/or the indication information of the interference measurement signal; and is configured to receive physical layer signaling, where the physical layer signaling is used to activate or deactivate the preconfigured indication information of the interference measurement resource and/or the preconfigured indication information of the interference measurement signal.

In an example, when the transmitter sends the interference measurement signal on the interference measurement resource, the interference measurement resource and/or the interference measurement signal is orthogonal in time domain, orthogonal in frequency domain, or orthogonal in code domain.

According to a fifth aspect, this application provides a terminal, including a processor, configured to: measure, based on information about an interference measurement resource and information about an interference measurement signal, an interference measurement signal transmitted by another terminal, to obtain interference measurement signal strength, where the interference measurement signal is a signal used to measure interference between links in different directions, and the different directions include a downlink direction between the another terminal and a first network device and an uplink direction between the terminal and a second network device; and control, based on the interference measurement signal strength, power at which the terminal sends a data signal to the second network device.

In an example, the terminal further includes a receiver, configured to receive a relationship between a characteristic of the interference measurement signal and a location of the data signal, where the location includes at least one of a time domain location, a frequency domain location, and a space domain location; and that the processor is configured to control, based on the interference measurement signal strength, the power at which the terminal sends the data signal to the second network device includes: the processor is specifically configured to: determine the characteristic of the interference measurement signal sent by a first terminal; determine, based on the relationship, the location of the data signal corresponding to the interference measurement signal sent by the first terminal; and control, based on the interference measurement signal strength, a second terminal to control the sending power of the data signal at the determined location.

In an example, that the receiver is configured to receive the relationship between the characteristic of the interference measurement signal and the location of the data signal includes: the receiver is specifically configured to receive the relationship that is between the characteristic of the interference measurement signal and the location of the data signal and that is sent by the first network device or the second network device.

In an example, that the receiver is configured to receive the relationship between the characteristic of the interference measurement signal and the location of the data signal includes: the receiver is specifically configured to receive the relationship that is between the characteristic of the interference measurement signal and the location of the data signal and that is configured for the second terminal through OAM.

In an example, that the receiver is configured to receive the relationship between the characteristic of the interference measurement signal and the location of the data signal includes: the receiver is specifically configured to receive at least one of RRC signaling, MAC layer signaling, or physical layer signaling, where the signaling includes the relationship between the characteristic of the interference measurement signal and the location of the data signal.

In an example, that the receiver is configured to receive the relationship between the characteristic of the interference measurement signal and the location of the data signal includes: the receiver is specifically configured to receive RRC signaling, where the RRC signaling is used to preconfigure the relationship between the characteristic of the interference measurement signal and the location of the data signal; and is configured to receive physical layer signaling, where the physical layer signaling is used to activate or deactivate the preconfigured relationship between the characteristic of the interference measurement signal and the location of the data signal.

In an example, the interference measurement signal strength obtained by the processor through measurement includes any one or more of the following: reference signal received power, reference signal received quality, a received signal strength indicator, a channel quality indicator, and a channel state indicator.

In an example, that the processor is configured to control, based on the interference measurement signal strength, the power at which the terminal sends the data signal to the second network device includes: the processor is specifically configured to: determine an uplink modulation and coding scheme to the second network device based on a correspondence between the interference measurement signal strength and the uplink modulation and coding scheme; or determine uplink transmit power to the second network device based on a correspondence between the interference measurement signal strength and a transmit power control parameter.

In an example, the terminal further includes a receiver, configured to receive signaling sent by the second network device, where the signaling includes the correspondence between the interference measurement signal strength and the uplink modulation and coding scheme and/or the correspondence between the interference measurement signal strength and the transmit power control parameter.

In an example, the signaling is at least one of radio resource control signaling, MAC layer signaling, or physical layer signaling.

In an example, the physical layer signaling is uplink grant signaling or signaling in downlink control information.

In an example, the transmit power control parameter includes any one or more of the following: a target power value, a path loss compensation factor, a closed-loop transmit power value, and a cross-link interference parameter.

In an example, the receiver is configured to: when interference measurement is mid-term or long-term interference measurement, receive the cross-link interference parameter sent by the second network device to a second terminal by using higher layer signaling; or when interference measurement is short-term interference measurement, receive the cross-link interference parameter sent by the second network device to a second terminal by using MAC layer signaling or physical layer signaling.

In an example, the correspondence between the interference measurement signal strength and the uplink modulation and coding scheme includes a correspondence between an interference measurement signal strength level and the uplink modulation and coding scheme.

In an example, the correspondence between the interference measurement signal strength and the transmit power control parameter includes a correspondence between an interference measurement signal strength level and the transmit power control parameter.

In an example, the strength level is determined based on a signal strength threshold.

According to a sixth aspect, this application provides a terminal, including: a processor, configured to measure, based on information about an interference measurement resource and information about an interference measurement signal, an interference measurement signal transmitted by another terminal, to obtain interference measurement signal strength, where the interference measurement signal is a signal used to measure interference between links in different directions, and the different directions include a downlink direction between the another terminal and a first network device and an uplink direction between the terminal and a second network device.

In an example, the terminal further includes a transmitter, configured to send the interference measurement signal strength to the first network device.

In an example, a type of the interference measurement signal strength obtained by the processor through measurement includes any one or more of the following: reference signal received power, reference signal received quality, a received signal strength indicator, a channel quality indicator, and a channel state indicator.

In an example, the processor is further configured to establish an association relationship between the type of the interference measurement signal strength and an uplink direction.

In an example, the terminal further includes a transmitter, configured to send the association relationship between the type of the interference measurement signal strength and the uplink direction to the first network device.

In an example, that the transmitter is configured to send the association relationship between the type of the interference measurement signal strength and the uplink direction to the first network device includes: the transmitter is specifically configured to send the association relationship between the type of the interference measurement signal strength and the uplink direction to the first network device by using either of the following two resources, where the resources include a reserved resource located in a PUCCH in a subframe including a PDCCH, a PDSCH, and the PUCCH and a reserved resource located in a PUSCH or a PUCCH in a subframe including a PDCCH, the PUSCH, and the PUCCH.

In an example, that the transmitter is configured to send the interference measurement signal strength to the first network device includes: the transmitter is specifically configured to send the interference measurement signal strength to the first network device by using either of the following two resources, where the resources include a reserved resource located in a PUCCH in a subframe including a PDCCH, a PDSCH, and the PUCCH and a reserved resource located in a PUSCH or a PUCCH in a subframe including a PDCCH, the PUSCH, and the PUCCH.

In an example, the reserved resource is included in at least one of RRC signaling, MAC layer signaling, and physical layer signaling that are sent by the first network device.

According to a seventh aspect, this application further provides a network device, including a transmitter, configured to send an interference measurement signal on an interference measurement resource to another network device, where the interference measurement signal is a signal used to measure interference between links in different directions.

In an example, the transmitter is further configured to send indication information of the interference measurement resource and/or indication information of the interference measurement signal to a terminal associated with the network device, so that the terminal performs a rate matching or data puncturing operation on received data based on the indication information.

In an example, the indication information of the interference measurement resource and/or the indication information of the interference measurement signal are/is sent by using at least one of RRC signaling, MAC layer signaling, and physical layer signaling.

According to an eighth aspect, this application provides a network device, including a processor, configured to measure, based on information about an interference measurement resource and information about an interference measurement signal, an interference measurement signal transmitted by another network device, to obtain interference measurement signal strength.

In an example, the network device further includes a transmitter, configured to send the interference measurement signal strength to the another network device.

In an example, the network device further includes a transmitter, configured to send indication information of the interference measurement resource and/or indication information of the interference measurement signal to a terminal associated with the network device, so that the terminal performs a rate matching or data puncturing operation on uplink transmitted data based on the indication information.

In an example, the indication information of the interference measurement resource and/or the indication information of the interference measurement signal are/is sent by using at least one of RRC signaling, MAC layer signaling, and physical layer signaling.

DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

In the field of communications technologies, a base station and a terminal may operate in a flexible duplex mode. Between neighboring cells in which the flexible duplex mode is used, data transmission in a direction in a cell causes interference to data transmission in another direction in another cell. Such interference caused between communications links in different directions may be referred to as cross-link interference.

The data transmission may be transmission on a control channel or a data channel. The interference caused by the data transmission in a direction in a cell to the data transmission in another direction in another cell includes interference between data transmission on a control channel in a direction in a cell and data transmission on a control channel in another direction in another cell, or interference between data transmission on a control channel in a direction in a cell and data transmission on a data channel in another direction in another cell, or interference between data transmission on a data channel in a direction in a cell and data transmission on a data channel in another direction in another cell.

The following describes a cause of interference with reference to specific application scenarios.

A duplex mode may include time division duplex (Time Division Duplex, TDD) and frequency division duplex (Frequency Division Duplex, FDD). A TDD mode is used as an example. Seven uplink data and downlink data configuration manners in the following table may be included.

TABLE 1

| Number of an uplink-downlink configuration | Subframe number | | | | | | | | | |
|---|---|---|---|---|---|---|---|---|---|---|
| manner | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D represents a downlink subframe, U represents an uplink subframe, and S represents a special subframe.

Figure 1:
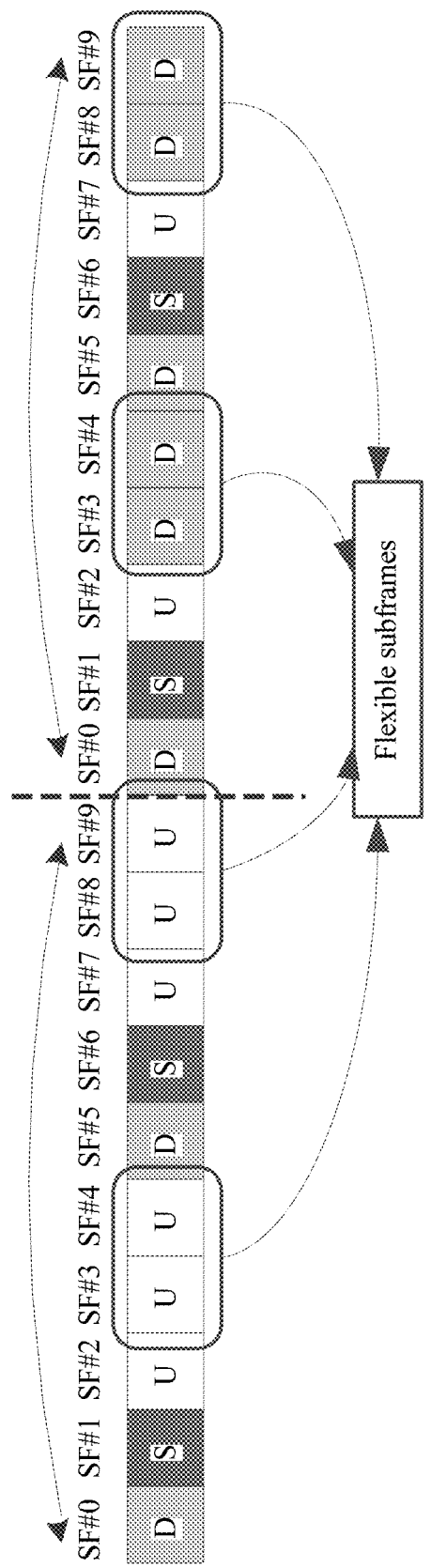
FIG. 1 is a schematic diagram of two TDD configuration manners that are allowed to be used in a cell according to this application.

It may be learned from Table 1 that, if a cell may dynamically change TDD configurations based on the seven configuration manners for a purpose of meeting a service requirement, directions of subframes with numbers 0, 1, 2, and 5 are fixed, and directions of subframes with other numbers are variable. Subframes having fixed directions, for example, the subframes with numbers 0, 1, 2, and 5, may be referred to as fixed subframes; and subframes having variable directions, for example, subframes with numbers 3, 4, 6, 7, 8, and 9 may be referred to as flexible subframes. Certainly, the fixed subframes and the flexible subframes may vary according to a TDD configuration manner that is allowed to be used. For example, as shown in FIG. 1, it is assumed that a cell supports only TDD configuration manners whose configuration numbers are 0 and 2, a configuration manner with a number 0 is used before the change, and a configuration manner with a number 2 is used after the change. In this case, subframes with numbers 0, 1, 2, 5, 6, and 7 are fixed subframes, and subframes with numbers 3, 4, 8, and 9 are flexible subframes (Flexible Subframe).

Figure 2:
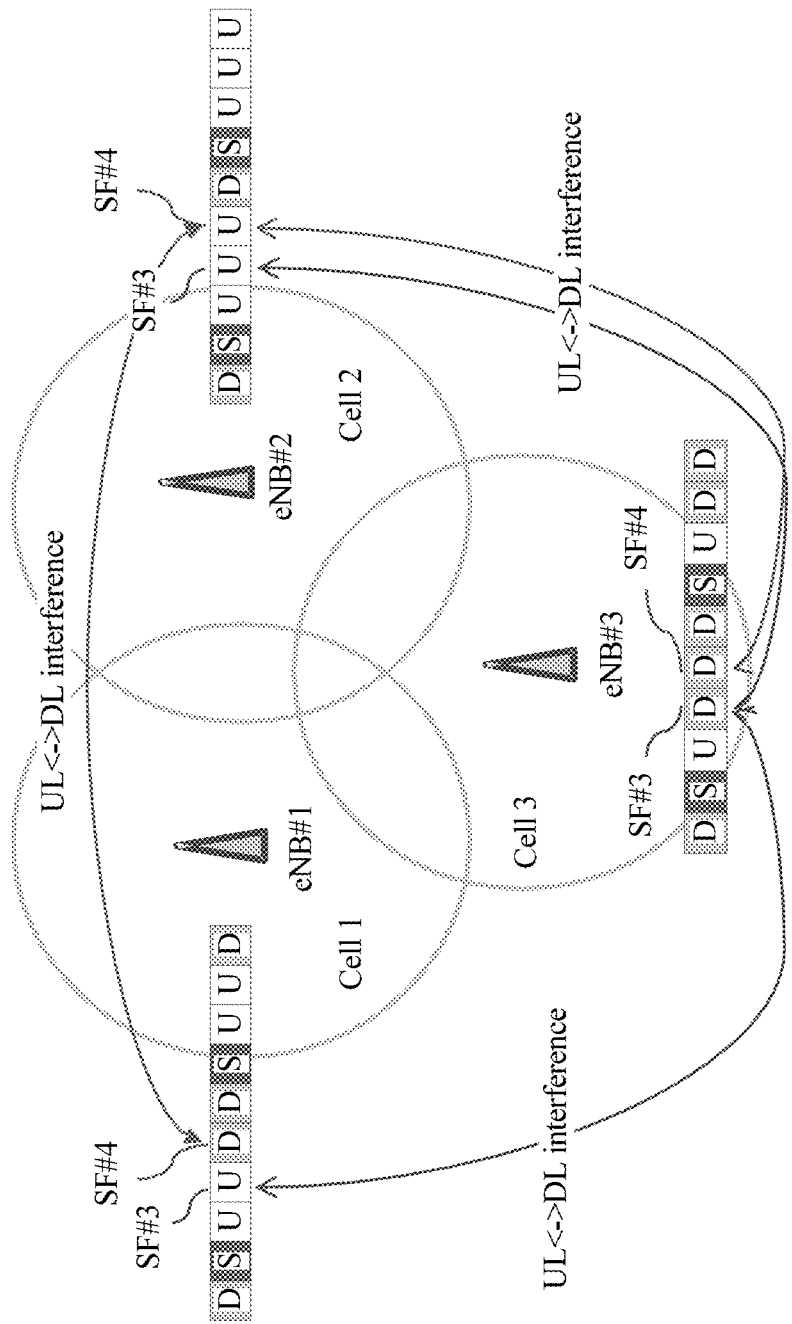
FIG. 2 is a schematic diagram of interference between neighboring cells according to this application.

As shown in FIG. 2, it is assumed that three cells are neighbors. A TDD configuration manner with a number 1 is used in a cell 1, a TDD configuration manner with a number 0 is used in a cell 2, and a TDD configuration manner with a number 2 is used in a cell 3. It may be found by comparing the three TDD configuration manners that, for a base station eNB #1, a subframe sf #3 and a subframe sf #4 are flexible subframes, and strength of interference suffered by the two subframes is different from strength of interference suffered by other subframes. In addition, for the base station eNB #1, the subframe sf #3 suffers interference (interference) from a subframe configured by a base station eNB #3 in a D direction, the subframe sf #4 suffers interference (interference) from a subframe configured by a base station eNB #2 in a U direction, and statuses of the interference suffered by the two subframes are different.

It should be noted that technical solutions in this application are not limited to the foregoing application scenarios, and interference may also exist in other application scenarios. For example, the foregoing describes a change of a TDD configuration manner in time domain. Certainly, a change of a TDD configuration manner in frequency domain or a change of a transmission direction in the entire frequency domain, for example, a change of a TDD configuration manner on an entire particular frequency band or some subbands of a frequency band, or a change of a transmission direction on the entire particular frequency band or some subbands of the frequency band, may also cause interference between neighboring cells. In addition, not only a change of a TDD configuration manner causes interference, but also a change of an FDD configuration manner may cause the foregoing interference.

In conclusion, in any of the foregoing application scenarios, the base station and the terminal operate in the flexible duplex mode; and used communications links are links in different directions, and may also be referred to as cross links. A base station in a cell may dynamically change a transmission direction of a link resource based on a service requirement, causing interference between a plurality of neighboring cells including the cell. When a configuration of the transmission direction is dynamically changed, caused interference is dynamic. The interference causes impact to a data signal transmitted on the link, and such impact may be adjusted by controlling transmit power of the data signal. For example, for a terminal suffering interference, if the interference is relatively strong, transmit power of a data signal of a terminal causing the interference may be reduced; or if the interference is relatively weak, the transmit power of the data signal of the terminal causing the interference is allowed to be increased, to ensure data transmission/receiving reliability. The terminals in the foregoing example may be replaced with base stations. In other words, when interference occurs between base stations, for a base station suffering the interference, if the interference is relatively strong, transmit power of a data signal of a base station causing the interference may be reduced; or if the interference is relatively weak, the transmit power of the data signal of the base station causing the interference is allowed to be increased, to ensure data transmission/receiving reliability.

Currently, a power control solution in an enhanced interference management and traffic adaptation (Enhanced Interference Management and Traffic Adaptation, eIMTA) technology is disclosed. In the solution, a type of interference between a subframe in a TDD configuration manner of a serving cell and a subframe in a TDD configuration manner of a neighboring cell is set, and sending power is set for a device in the serving cell based on the type of the interference.

However, in the technology, subframe resources applicable for power control are allocated based on semi-static TDD configuration, and resource allocation and related signaling notification are not performed in a timely manner. Consequently, the technology is not applicable to the foregoing communications system using the flexible duplex mode in which the transmission direction is relatively dynamically configured.

Therefore, this application provides a solution for controlling transmit power based on cross-link interference measurement. When a transmission direction of a time domain/frequency domain resource is configured relatively dynamically, interference caused by such a configuration can be dynamically measured in this application, and the sending power can be adjusted based on the measurement in a timely manner.

Figure 3:
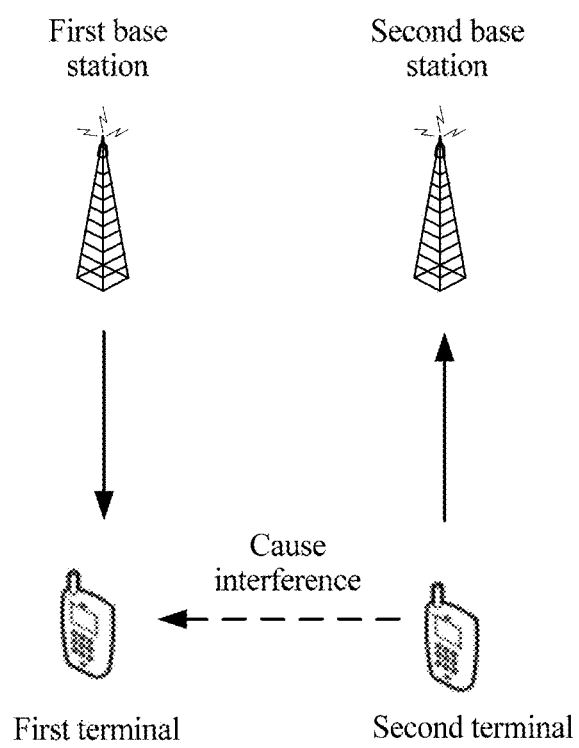
FIG. 3 is an architectural diagram of a system in which interference is generated between neighboring cells according to this application.

For ease of understanding the technical solutions, two cells in neighboring cells are used as an example for description. For ease of differentiation, the two cells may be referred to as a first cell and a second cell. A system architecture used for implementing the technical solutions is shown in FIG. 3. A base station in the first cell is referred to as a first base station, a base station in the second cell is referred to as a second base station, a terminal in the first cell is referred to as a first terminal, and a terminal in the second cell is referred to as a second terminal. The second terminal operates in an uplink mode, and the first terminal operates in a downlink mode. In other words, sending of an uplink data signal by the second terminal causes interference to receiving of a downlink data signal by the first terminal. In this application, there may be one or more first terminals/second terminals. To include various application scenarios, the first base station may be generalized as a first network device, and the second base station may be generalized as a second network device.

Based on the foregoing system architecture, there are two solutions to control interference caused by the second terminal to the first terminal: One solution may be controlling power at which the second terminal sends a data signal, and the other solution may be controlling power at which the first terminal receives a data signal. Therefore, this application provides the following several specific embodiments.

Embodiment 1

Figure 4:
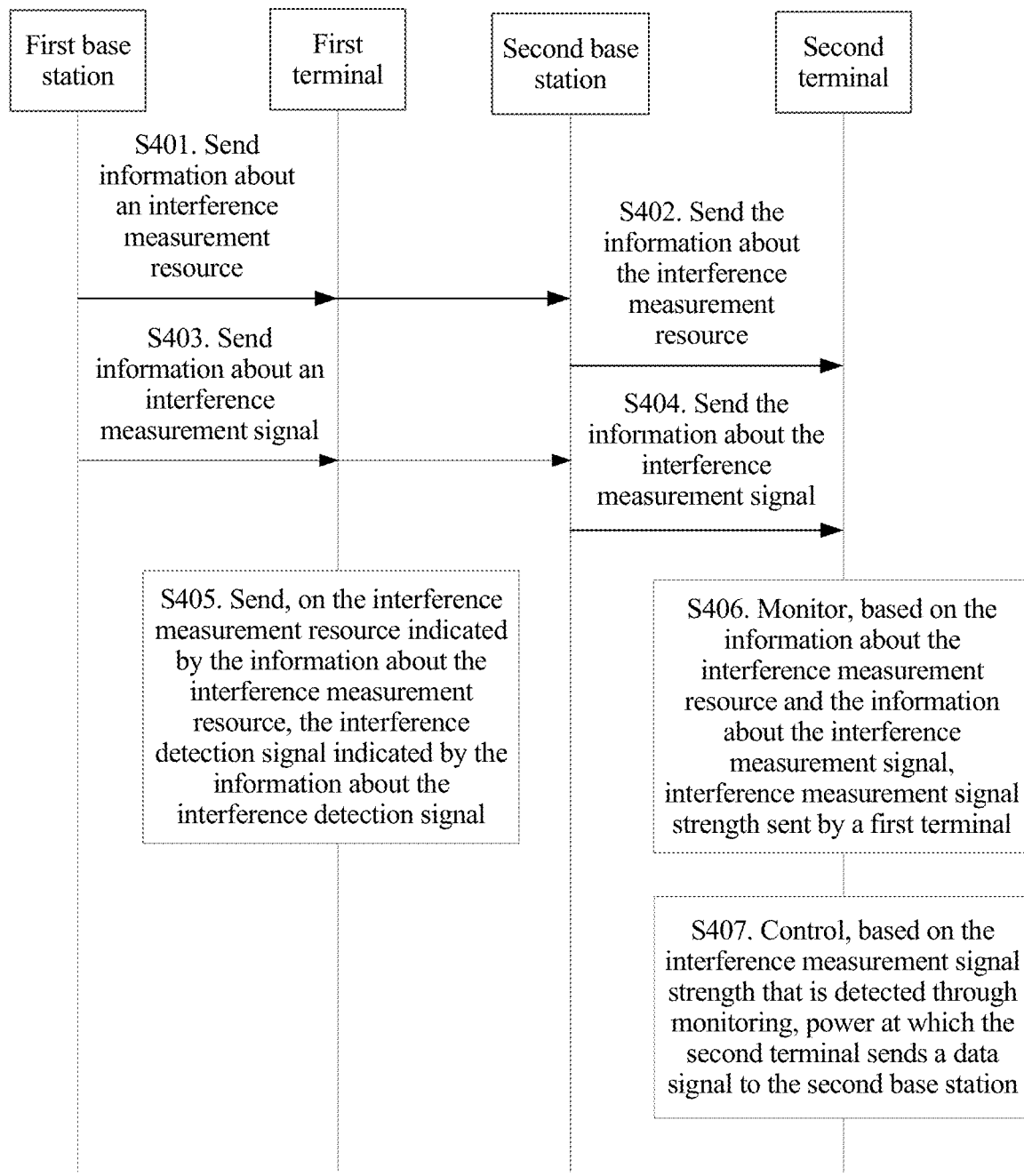
FIG. 4 is a schematic flowchart of power control based on interference measurement according to this application.

FIG. 4 is a schematic flowchart of power control based on interference measurement. Specifically, steps S401 to S407 are included.

S401. A first base station sends information about an interference measurement resource to a first terminal and a second base station.

The first base station and the second base station are located in two neighboring cells. The first base station may simultaneously send the information to the first terminal and the second base station, or may send the information at different time.

The interference measurement resource is a resource used to send an interference measurement signal, and the interference measurement signal is a signal used to measure interference strength between links in different directions. Alternatively, the interference measurement resource may be considered as a resource used to measure interference, and the interference measurement signal may be considered as a signal used to measure interference. Interference measurement may also be referred to as interference detection, interference monitoring, interference sensing, or the like. The interference is interference between transmission in different directions.

The information about the interference measurement resource (which may also be referred to as indication information or configuration information) is used to indicate a type of resource used to transmit the interference measurement signal. Specifically, the information about the interference measurement resource may include any one or more of the following: a time location, a frequency domain location, and a space domain location for transmitting the interference measurement signal. In other words, the interference measurement resource may be indicated by using at least one of the time location, the frequency domain location, and the space domain location for transmitting the interference measurement signal.

The time location (or a time domain resource) for transmitting the interference measurement signal may include a subframe (subframe), a slot (slot), a mini-slot (mini slot), a mini-subframe (mini subframe), an orthogonal frequency division multiplexing (Orthogonal Frequency Division Multiplexing, OFDM) symbol, or a resource unit fewer than one OFDM symbol. The OFDM symbol may be one or more OFDM symbols. The frequency domain location (or a frequency domain resource) for transmitting the interference measurement signal may include a frequency band (band), a subband (subband), a frequency offset (frequency offset), a control channel element (control channel element, CCE), or a physical resource block (physical resource block, PRB). The space domain location (or a space domain resource) for transmitting the interference measurement signal may include a transmission port (port) or a transmission beam. The transmission beam may be indicated by using an identifier related to the beam, for example, by using a time domain identifier of a synchronization signal resource block, a time domain identifier of a synchronization signal, or an identifier of a reference signal.

Specifically, the time location for transmitting the interference measurement signal may be one or more time locations, and may be continuous or discontinuous; and the frequency domain location for transmitting the interference measurement signal may be one or more frequency domain locations, and may be continuous or discontinuous. The continuous or discontinuous time locations and/or frequency domain locations may all be in a particular pattern (pattern). The mini-slot (mini slot) is a resource unit including OFDM symbols fewer than one slot; and the mini-subframe (mini subframe) is a resource unit including OFDM symbols fewer than one slot.

When the interference measurement resource is an OFDM symbol, the interference measurement resource is less than or equal to a length of one subframe.

The interference measurement resource may be included in any one of the following types of subframes: a first-type subframe, which is a subframe including a physical downlink control channel (Physical Downlink Control Channel, PDCCH) and a physical downlink shared channel (Physical Downlink Shared Channel, PDSCH); a second-type subframe, which is a subframe including a physical uplink control channel (Physical Uplink Control Channel, PUCCH) and a physical uplink shared channel (Physical Uplink Shared CHannel, PUSCH); a third-type subframe, which is a subframe including a PDCCH, a PDSCH, and a PUCCH; and a fourth-type subframe, which is a subframe including a PDCCH, a PUSCH, and a PUCCH.

The third-type subframe and the fourth-type subframe may include a guard period (guarding period, GP), and the guard period is used for uplink-downlink conversion. In the third-type subframe and the fourth-type subframe, the interference measurement resource may be one or more time locations, for example, one or more OFDM symbols, after the PDCCH, or may be one or more time locations, for example, one or more OFDM symbols, before the PUCCH. The third-type subframe may be referred to as a new subframe, a downlink mixed subframe, or a self-contained subframe; and the fourth-type subframe may be referred to as a new subframe, an uplink mixed subframe, or a self-contained subframe.

Figure 5:
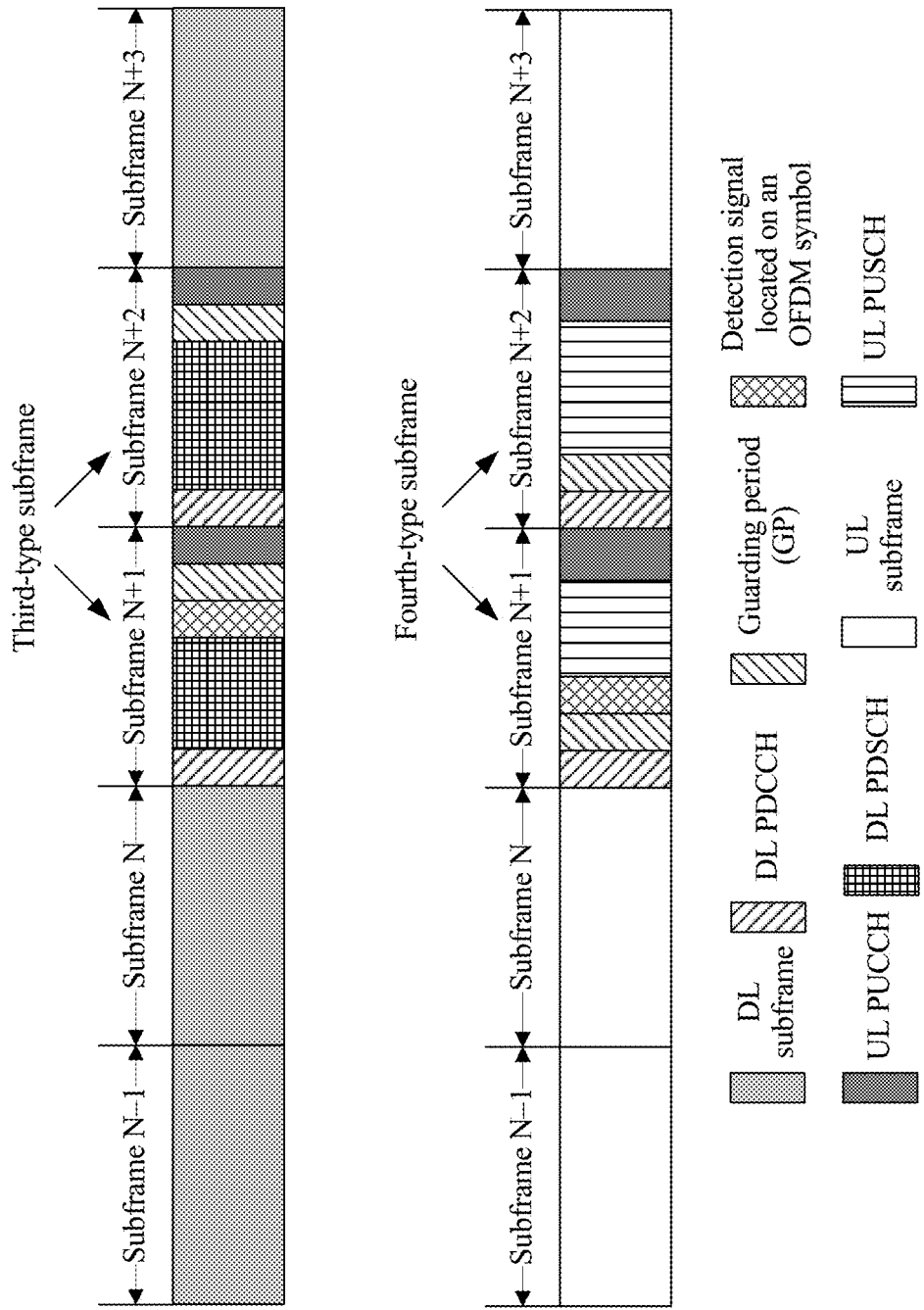
FIG. 5 is a schematic diagram of a new subframe according to this application.

As shown in FIG. 5, the third subframe and the fourth subframe in the first line are third-type subframes. The third subframe is a third-type subframe including an interference measurement resource (an area filled with cross oblique lines), and the fourth subframe is a third-type subframe that does not include an interference measurement resource. The third-type subframe is a new DL (downlink, downlink) dominant subframe (or referred to as a new DL-dominant subframe, or referred to as a new DL-centered subframe, or referred to as a self-contained downlink subframe). In the third-type subframe, the interference measurement resource is one or more time locations, for example, one or more OFDM symbols, before a PUCCH.

In FIG. 5, the third subframe and the fourth subframe in the second line are fourth-type subframes. The third subframe is a fourth-type subframe including an interference measurement resource, and the fourth subframe is a fourth-type subframe that does not include an interference measurement resource. The fourth-type subframe is a new UL (uplink, uplink) dominant subframe (or referred to as a new UL-dominant subframe, or referred to as a new UL-centered subframe, or referred to as a self-contained uplink subframe). In the fourth-type subframe, the interference measurement resource is one or more time locations, for example, one or more OFDM symbols, after a PDCCH.

When a resource unit is a slot, interference measurement may be performed in a first slot, and data is transmitted in a second slot. When a resource unit is a subframe, the interference measurement may be performed on a first subframe, and data is transmitted on a second subframe.

It should be noted that time domain coordination, frequency domain coordination, or code domain coordination may be performed on interference measurement resources used by the first base station and the second base station, so that the interference measurement resources between the first base station and the second base station are orthogonal or quasi-orthogonal, and therefore can be easily detected. The frequency domain coordination and the code domain coordination may be performed on a same time resource. In this way, the interference measurement resources may be preconfigured. The coordination may be coordination based on mutual notification between the base stations, or may be coordination preconfigured through OAM (operation, administration and management).

The first base station may send the information about the interference measurement resource to the second base station by using air interface signaling. The first base station may send the information about the interference measurement resource to the first terminal by using air interface signaling.

S402. The second base station sends the information about the interference measurement resource to a second terminal.

S403. The first base station sends information about an interference measurement signal to the first terminal and the second base station.

The first base station may simultaneously send the information about the interference measurement signal to the first terminal and the second base station, or may send the information about the interference measurement signal at different time. The first base station may send the information about the interference measurement signal to the second base station through an interface between the two base stations. The first base station may send the information about the interference measurement signal to the first terminal by using air interface signaling.

The information about the interference measurement signal may be the interference measurement signal or configuration information of the interference measurement signal. The configuration information may instruct the first terminal to generate a corresponding interference measurement signal based on the configuration information.

S404. The second base station sends the information about the interference measurement signal to the second terminal.

The second base station may send the information about the interference measurement signal and/or the information about the interference measurement resource to the second terminal by using air interface signaling.

It should be noted that a sequence for performing steps S401 to S404 is not limited to that shown in the figure. Based on a setting of the first base station, the first base station may send the information about the interference measurement resource and/or the information about the interference measurement signal to the first terminal, and send the information about the interference measurement resource and/or the information about the interference measurement signal to the second base station. These sending actions may be performed simultaneously, or may be performed sequentially; and a performing sequence is not specifically limited. After receiving the information about the interference measurement signal and/or the information about the interference measurement signal, the second base station may send the information about the interference measurement and/or the information about the interference measurement signal to the second terminal based on a setting of the second base station.

It should be noted that steps S401 to S404 are to configure the information about the interference measurement resource and the information about the interference measurement signal for the first terminal and to configure the information about the interference measurement resource and the information about the interference measurement signal for the second terminal. Certainly, a configuration manner is not limited to that in Embodiment 1, and there may be the following several configuration manners.

In another configuration manner, when the information about the interference measurement resource and the information about the interference measurement signal are configured for the first base station and the second base station through OAM, the first base station configures both the information for the first terminal, and the second base station configures both the information for the second terminal. In still another implementation, the information about the interference measurement resource and the information about the interference measurement signal are directly configured for the first terminal and the second terminal through OAM. In yet another implementation, the first base station and the second base station negotiate the information about the interference measurement resource and/or the information about the interference measurement signal, then the first base station sends negotiated information about the interference measurement resource and/or negotiated information about the interference measurement signal to the first terminal, and the second base station sends the negotiated information about the interference measurement resource and/or the negotiated information about the interference measurement signal to the second terminal. The negotiated information about the interference measurement resource and the negotiated information about the interference measurement signal may be information about the interference measurement resource and information about the interference measurement signal that are sent by the first base station to the second base station, or may be information about the interference measurement resource and information about the interference measurement signal that are sent by the second base station to the first base station.

S405. The first terminal sends, on the interference measurement resource indicated by the information about the interference measurement resource, the interference measurement signal indicated by the information about the interference measurement signal.

The information about the interference measurement signal (which may also be referred to as indication information or configuration information) is used to indicate a type of an interference measurement signal used to perform interference measurement. The information about the interference measurement signal includes at least one of the following: a sequence length (sequence length), a cyclic shift (cyclic shift), a physical cell identifier (physical cell ID), and a pseudo-random sequence initial value (pseudo-random sequence initial value). A form of the interference measurement signal is indicated by using the information about the interference measurement signal. The interference measurement signal may specifically include the following several forms: a demodulation reference signal (demodulation reference signal, DMRS), a channel state information-reference signal (CSI-RS), a sounding reference signal (sounding reference signal, SRS), a preamble (preamble), or a new signal. Any one of the foregoing signals may be a signal determined or configured based on at least one of the sequence length (sequence length), the cyclic shift (cyclic shift), the physical cell identifier (physical cell ID), and the pseudo-random sequence initial value (pseudo-random sequence initial value). The information about the interference measurement signal may further include a transmission port (port) or a transmission beam for the interference measurement signal, where the transmission port (port) or the transmission beam is a transmission port (port) or a transmission beam of a terminal. In a high-frequency system, information about an interference measurement signal further includes a transmission beam for the interference measurement signal. The transmission beam may be indicated by using an identifier related to the beam, for example, by using a time domain identifier of a synchronization signal resource block, a time domain identifier of a synchronization signal, or an identifier of a reference signal.

A first cell and a second cell may pre-negotiate and predefine an interference measurement signal. The two cells each have a corresponding interference measurement signal, and the interference measurement signals are orthogonal, to avoid incorrect monitoring of an interference measurement signal. If each cell may correspond to a group of interference measurement signals (a group may also be referred to as a set), two groups of interference measurement signal sets are orthogonal.

S406. The second terminal determines, based on the information about the interference measurement resource and the information about the interference measurement signal, interference measurement signal strength sent by the first terminal.

Specifically, the second terminal may determine, based on the information about the interference measurement resource, a resource on which the interference measurement signal is to be monitored, measure the interference monitoring signal after detecting, through monitoring, the interference measurement signal, and determine interference measurement signal strength or a path loss by using the information about the interference measurement signal.

When the interference measurement signal strength is measured, one or more of the following interference measurement signal strength values may be measured: reference signal received power (Reference Signal Received Power, RSRP), reference signal received quality (Reference Signal Received Quality, RSRQ), a received signal strength indicator (Received Signal Strength Indicator, RSSI), a channel quality indicator (Channel Quality Indicator, CQI), and a channel state indicator (Channel State Indicator, CSI).

The interference measurement signal strength may be included in an interference measurement report. The interference measurement report may be reported to the second base station, and a resource used for reporting may be reserved to ensure that the interference measurement report is reported in a timely manner. The reserved resource may be located in a PUCCH/PUSCH of any subframe, for example, a PUCCH/PUSCH of a third-type subframe or a fourth-type subframe. The reserved resource may be notified by a corresponding base station to a terminal by using higher layer signaling.

Interference measurement of the second terminal may be mid-term/long-term interference measurement, or may be short-term interference measurement. Interference measurement duration, for example, a quantity of interference measurement sampling values or a quantity of interference measurement resources, needs to be notified by the second base station to the second terminal by using at least one of higher layer signaling, MAC layer signaling, and physical layer signaling.

S407. The second terminal controls, based on the interference measurement signal strength that is detected through monitoring, power at which the second terminal sends a data signal to the second base station.

The second base station may send several groups of optional uplink transmission manners to the second terminal by using signaling. The signaling may include uplink grant signaling or other signaling in downlink control information. Alternatively, the second base station may configure an uplink transmission manner for the second terminal. The configuration manner may be configuring by using radio resource control (Radio Resource Control, RRC) signaling, or may be configuring by using physical layer signaling. The configuration may be preconfiguration or dynamic configuration. A preconfigured uplink transmission manner may be activated or deactivated by using physical layer signaling in a PDCCH. The physical layer signaling may be uplink grant signaling or other signaling in downlink control information. Alternatively, the second base station performs configuration by using air interface signaling or performs configuration through OAM.

It should be noted that a current physical uplink shared channel (Physical Uplink Shared CHannel, PUSCH) power control manner in the 3rd Generation Partnership Project (3rd Generation Partnership Project, 3GPP) is as follows:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix},$$

where $P_{CMAX,c}(i)$ represents maximum power, $M_{PUSCH,c}(i)$ represents a quantity of physical resource blocks (Physical Resource Block, PRB), $P_{O\_PUSCH,c}(j)$ and $\alpha_c(j)$ are semi-statically configured parameters, $PL_c$ is a path loss estimated by user equipment (User Equipment, UE), $\Delta_{TF,c}(i)$ is an incremental value for a different modulation and coding scheme (Modulation and Coding Scheme, MCS), and $f_c(i)$ is a power adjustment value generated during closed-loop power control by a terminal.

In the foregoing power control $P_{O\_PUSCH,c}(j)$ and $\alpha_c(j)$ are semi-statically configured, and values remain unchanged for all subframes. A semi-statically configured configuration period is relatively long, and is not applicable to a system using a flexible duplex mode. However, in this embodiment, the uplink transmission manner is configured by the second base station for the second terminal in a dynamic manner such as by using uplink grant signaling or a PDCCH. The configuration manner is more dynamic, and can be applied to the system using the flexible duplex mode.

In addition, in the system using the flexible duplex mode, cross-slot interference exists between neighboring cells, and interference between different uplink subframes may be different. A cell is used as an example. Interference suffered on an uplink subframe by a base station in the cell may be uplink interference caused by downlink transmission performed by a neighbor base station, and interference suffered on another uplink subframe may be uplink interference caused by uplink transmission performed by a terminal served by the neighbor base station. However, in this embodiment, a plurality of uplink transmission manners may be configured for the second terminal, and the second terminal may select, based on the interference measurement signal strength that is detected through monitoring, to use a corresponding uplink transmission manner. In the uplink transmission manner, an interference difference caused by transmission in different uplink and downlink directions is considered, to avoid impact caused by cross-link interference to efficient data transmission, and further increase an efficient data transmission rate.

The second base station further needs to configure a correspondence between the interference measurement signal strength and the uplink transmission manner for the second terminal. After detecting, through monitoring, the interference measurement signal strength, the second terminal may select the corresponding uplink transmission manner based on the correspondence between the interference measurement signal strength and the uplink transmission manner.

In an example, the correspondence between the interference measurement signal strength and the uplink transmission manner may be specifically a correspondence between an interference measurement signal strength level and the uplink transmission manner. The strength level may be determined based on a signal strength range, and the signal strength range is determined based on a signal strength threshold. In this way, the strength level corresponding to the interference measurement signal may be determined based on the interference measurement signal strength that is detected through monitoring, and the uplink transmission manner corresponding to the interference measurement signal is further determined. The signal strength threshold and/or the correspondence between the interference measurement signal strength level and the uplink transmission manner may be configured by the base station for the terminal by using higher layer signaling.

For example, the signal strength range [1 dB, 5 dB) corresponds to a strength level 1, and the signal strength range [5 dB, 10 dB) corresponds to a strength level 2. Assuming that the interference measurement signal strength detected, through monitoring, by the second terminal is 8 dB, it can be determined that the interference measurement signal strength corresponds to the strength level 2. The specific values are merely used as an example, and an actual value is not limited. Further, the second terminal may determine, based on the correspondence between the strength level and the uplink transmission manner, that the uplink transmission manner corresponding to the strength level 2 needs to be determined, to control transmit power of the data signal.

The uplink transmission manner may include a plurality of uplink modulation and coding schemes (Modulation and Coding Scheme, MCS) and/or a plurality of parameter values of a transmit power control parameter. The transmit power control parameter may include any one or more of the following four parameters: a target power value, a path loss compensation factor, a closed-loop transmit power value, and a cross-link interference parameter. The target power value includes a cell-specific target power value and a terminal-specific target power value. The cross-link interference parameter is a parameter that is added to a PUSCH power control formula in parallel with the target power value, and is used to compensate for determining of an uplink transmit power value caused by interference.

For example, if $P_{\_CLI}$ is used to represent the cross-link interference parameter, a new power control formula in which the cross-link interference parameter is introduced is:

$$P_{PUSCH,c}(i) = \min\begin{cases} P_{CMAX,c}(i), \\ 10\log_{10}(M_{PUSCH,c}(i)) + P_{\_CLI} + P_{O\_PUSCH,c}(j) + \\ \alpha_c(j) \cdot PL_c + \Delta_{TF,c}(i) + f_c(i) \end{cases}$$

The cross-link interference parameter may be notified by the second base station to the second terminal by using at least one of higher layer signaling, MAC layer signaling, and physical layer signaling. When the interference measurement is mid-term/long-term interference measurement, the cross-link interference parameter may be notified by the second base station to the second terminal by using the higher layer signaling. When the interference measurement is short-term interference measurement, the cross-link interference parameter may be notified by the second base station to the second terminal by using the MAC layer signaling or the physical layer signaling. When the cross-link interference parameter is notified to the second terminal by using the higher layer signaling, the cross-link interference parameter may be combined with the target power value into one parameter and notified to the second terminal, or may be separately notified to the second terminal. When the cross-link interference parameter is notified to the second terminal by using the physical layer signaling, the cross-link interference parameter may be combined with the closed-loop power value into one parameter and notified to the second terminal, or may be separately notified to the second terminal.

There may be a plurality of uplink transmission manners. Different uplink transmission manners correspond to different types of power control. For example, the power control includes PUSCH power control, PUCCH power control, or SRS (Sounding Reference Signal, sounding reference signal) power control.

For different modulation and coding schemes, transmit power of data signals generated according to different modulation and coding schemes is also different. The transmit power control parameter is a transmit power impact factor. Under constraints of different parameter values, transmit power values are also different. For details, refer to the physical uplink shared channel (Physical Uplink Shared CHannel, PUSCH) power control manner in the 3rd Generation Partnership Project (3rd Generation Partnership Project, 3GPP).

Regardless of a manner used to select an uplink transmission manner, the selected uplink transmission manner may be a modulation and coding scheme or some parameter values of a transmit power control parameter, and the transmit power of the data signal can be determined based on the uplink transmission manner. It should be noted that a relationship between the uplink transmission manner and the interference measurement signal strength is an inverse correlation relationship. In other words, if the interference measurement signal strength is higher, lower transmit power of the data signal is determined based on the uplink transmission manner and/or a lower-order MCS is selected to reduce interference. On the contrary, if the interference measurement signal strength is lower, higher transmit power of the data signal is determined based on the uplink transmission manner and/or a higher-order MCS is selected. In this way, reliability and/or a throughput for transmitting the data signal can be improved without causing interference.

The first base station configures a relationship between a characteristic of the interference measurement signal and a location of the data signal for the first terminal. The location includes any one or more of a time domain location, a frequency domain location, and a space domain location of the data signal. The relationship may be sent by the base station to the terminal after mutual negotiation. For example, the relationship is sent by the first base station to the second base station, sent by the second base station to the second terminal, and then sent by the first base station to the first terminal. Alternatively, the relationship may be configured for the base station through OAM, and sent by the base station to the terminal in a manner similar to the foregoing manner, or may be configured for both the base station and the terminal through OAM. The relationship may be sent by the first base station to the second base station by using interface signaling, for example, X2 signaling or air interface signaling, between the base stations. Then, the relationship is sent by the second base station to the second terminal and/or sent by the first base station to the first terminal by using air interface signaling. The air interface signaling may be specifically at least one of RRC signaling, MAC layer signaling, or physical layer signaling. Alternatively, the relationship may be preconfigured by using RRC signaling, and activated by using physical layer signaling.

A relationship between the characteristic of the interference measurement signal and the time domain of the data signal indicates a time for sending the data signal in correspondence with an interference measurement signal with a characteristic after the first terminal sends the interference measurement signal with the characteristic. A relationship between the characteristic of the interference measurement signal and the frequency domain of the data signal indicates a frequency domain location for sending the data signal in correspondence with an interference signal with a characteristic when the terminal sends the interference measurement signal with the characteristic. The characteristic may be the information about the interference measurement signal. The time domain/frequency domain may be subject to a predefined mode. A specific mode is, for example, a semi-statically scheduled time domain/frequency domain resource.

For example, after sending the interference measurement signal, the first terminal may send the data signal in next one or several subframes or slots. If the data signal is sent in several subframes or slots, these time domain resources, for example, subframes or slots, may be continuous or discontinuous. Being discontinuous may mean semi-static scheduling or semi-persistent scheduling (semi-persistent scheduling, SPS).

A relationship between the interference measurement signal and the location of the data signal may be sent to the second terminal. After detecting, through monitoring, an interference measurement signal, the second terminal may determine, based on the relationship between the interference measurement signal and the location of the data signal, a location at which the first terminal sends the data signal. In this way, the second terminal may control, at the corresponding location in the foregoing determined uplink transmission manner, the power at which the second terminal sends the data signal.

It should be noted that interference suffered by terminals at a relatively short distance is approximate, and therefore the interference measurement signal detected, through monitoring, by the second terminal or the determined uplink transmission manner may be used as a power control reference of a terminal that is relatively close to the second terminal. A criterion for determining whether a distance is relatively short may be that a difference between distance parameters such as reference signal received power (Reference Signal Receiving Power, RSRP) or reference signal received quality (Reference Signal Receiving Quality, RSRQ) is within a preset threshold range.

In this embodiment, the first terminal sends the interference measurement signal, the second terminal monitors the interference measurement signal strength, and the second terminal may directly control, based on the measured interference measurement signal strength, the power at which the second terminal transmits the data signal. In this application, interference measurement can be implemented at various granularities such as a frequency band, a subband, and a subframe, and the transmit power is controlled based on a measurement result.

Embodiment 2

Figure 6:
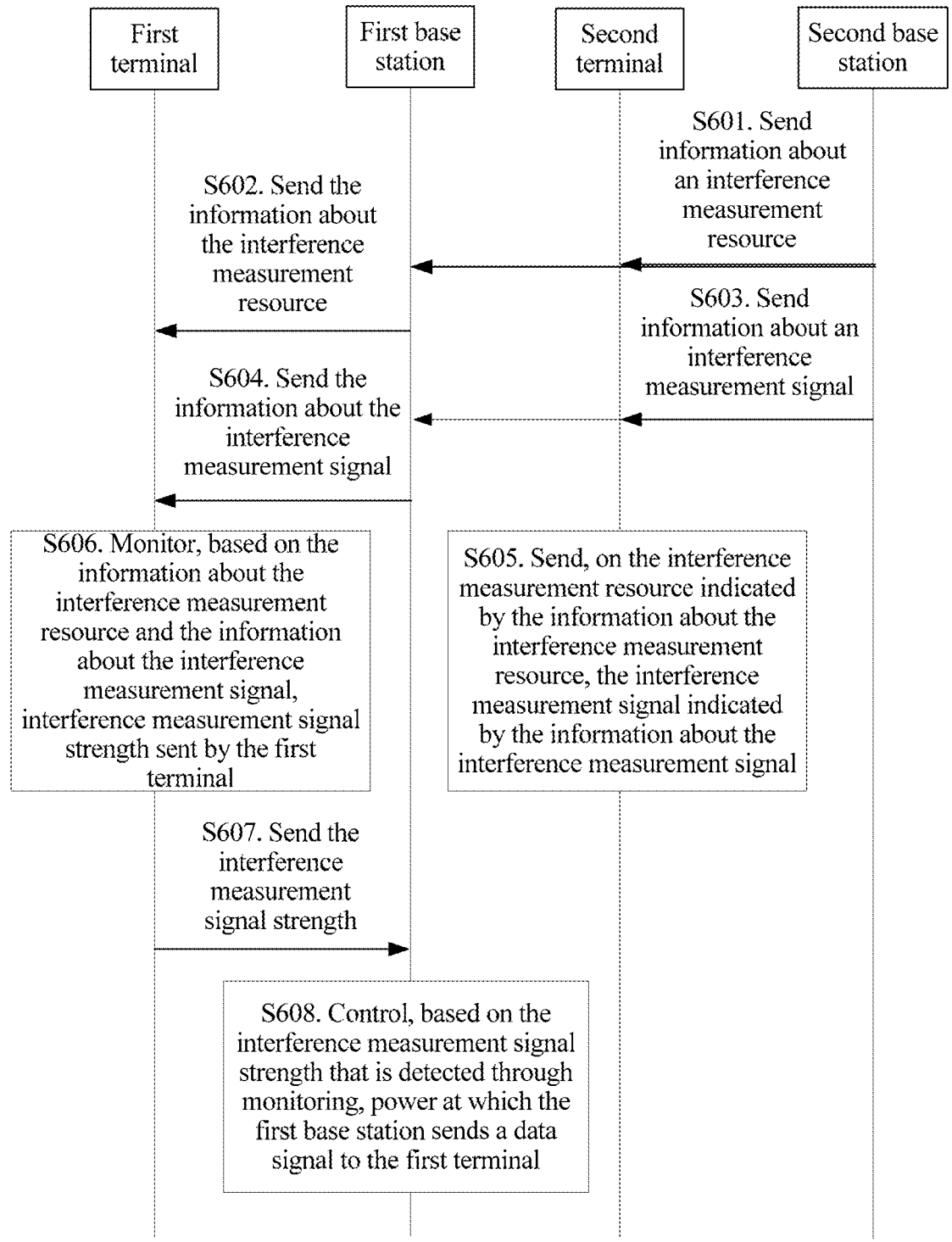
FIG. 6 is another schematic flowchart of power control based on interference measurement according to this application.

In Embodiment 1, the second terminal controls the power used to send the data signal to the second base station. In other words, a terminal causing interference adjusts transmit power of a data signal, to adaptively adjust interference caused by the terminal to a terminal that receives data in a neighboring cell. This application further provides Embodiment 2. In Embodiment 2, a first base station controls power used to send a data signal to a first terminal. FIG. 6 is a schematic flowchart of power control based on interference measurement. Specifically, steps S601 to S608 are included.

S601. A second base station sends information about an interference measurement resource to a second terminal and the first base station.

S602. The first base station sends the information about the interference measurement resource to the first terminal.

S603. The second base station sends information about an interference measurement signal to the second terminal and the first base station.

S604. The first base station sends the information about the interference measurement signal to the first terminal.

S605. The second terminal sends, on the interference measurement resource indicated by the information about the interference measurement resource, the interference measurement signal indicated by the information about the interference measurement signal.

S606. The first terminal monitors, based on the information about the interference measurement resource and the information about the interference measurement signal, interference measurement signal strength sent by the second terminal.

It should be noted that, for descriptions of steps S601 to S606 in this embodiment, reference may be made to S401 to S406 in Embodiment 1. The foregoing steps include the same action content as the corresponding steps in Embodiment 1, and only execution bodies of the actions are changed from the first base station and the first terminal to the second base station and the second terminal.

Similarly, a sequence for performing steps S601 to S604 is not limited to that shown in the figure. Based on a setting of the second base station, the second base station may send the information about the interference measurement resource and/or the information about the interference measurement signal to the second terminal, and send the information about the interference measurement resource and/or the information about the interference measurement signal to the first base station. These sending actions may be performed simultaneously, or may be performed sequentially; and a performing sequence is not specifically limited. After receiving the information about the interference measurement signal and/or the information about the interference measurement signal, the first base station may send the information about the interference measurement and/or the information about the interference measurement signal to the first terminal based on a setting of the first base station.

It should be noted that steps S601 to S604 are to configure the information about the interference measurement resource and the information about the interference measurement signal for the first terminal and to configure the information about the interference measurement resource and the information about the interference measurement signal for the second terminal. Certainly, a configuration manner is not limited to that in Embodiment 2, and there may be the following several configuration manners.

In another configuration manner, the information about the interference measurement resource and the information about the interference measurement signal are configured for the first base station and the second base station through OAM; and the first base station configures both the information for the first terminal, and the second base station configures both the information for the second terminal. In still another implementation, the information about the interference measurement resource and the information about the interference measurement signal are directly configured for the first terminal and the second terminal through OAM. In yet another implementation, the first base station and the second base station negotiate the information about the interference measurement resource and/or the information about the interference measurement signal, then the first base station sends negotiated information about the interference measurement resource and/or negotiated information about the interference measurement signal to the first terminal, and the second base station sends the negotiated information about the interference measurement resource and/or the negotiated information about the interference measurement signal to the second terminal. The negotiated information about the interference measurement resource and the negotiated information about the interference measurement signal may be information about the interference measurement resource and information about the interference measurement signal that are sent by the first base station to the second base station, or may be information about the interference measurement resource and information about the interference measurement signal that are sent by the second base station to the first base station.

S607. The first terminal sends the interference measurement signal strength to the first base station.

The interference measurement signal is sent by the second terminal in an uplink mode, and the interference measurement signal strength may be at least one of RSRP, RSRQ, an RSSI, a CQI, and a CSI. Therefore, the interference measurement signal may be recorded as UL-RSRP, UL-RSRQ, UL-RSSI, UL-CSI, UL-CQI, or the like. Such a UL-signal strength type recording manner may indicate a type of signal strength that is detected, through monitoring, by the first terminal and that is associated with an uplink direction. It should be noted that the recording manner may also be referred to as an association relationship. "UL" included in the association relationship indicates an uplink direction, to be specific, a measurement result of the interference measurement signal sent by the second terminal. Certainly, the first terminal may also record DL-RSRP, DL-RSRQ, a DL-RSSI, a DL-CSI, and a DL-CQI. However, "DL" in these association relationships indicates a downlink direction, to be specific, a measurement result of a downlink reference signal of the first base station. It can be learned that a link direction or a signal (to be specific, a general reference signal or an interference measurement signal) associated with measured signal strength may be differentiated by using "DL" and "UL".

Further, there may be a plurality of types of interference measurement signals. Therefore, a type of an interference measurement signal associated with the type of the signal strength may be further recorded. A recording manner is UL-signal type-signal strength type. For example, when the signal strength type includes the RSRP, the RSRQ, the RSSI, the CQI, and the CSI, and the signal type includes a DMRS, a CSI-RS, an SRS, and a preamble, 20 UL-signal type-signal strength type recording results may be obtained through combination.

If a type of the interference measurement signal is the SRS, a recording result includes UL-SRS-RSRP, UL-SRS-RSRQ, UL-SRS-RSSI, UL-SRS-CSI, and UL-SRS-CQI. If a type of the interference measurement signal is the CSI-RS, a recording result includes UL-CSI-RS-RSRP, UL-CSI-RS-RSRQ, UL-CSI-RS-RSSI, UL-CSI-RS-CSI, and UL-CSI-RS-CQI. If a type of the interference measurement signal is the DMRS, a recording result includes UL-DMRS-RSRP, UL-DMRS-RSRQ, UL-DMRS-RSSI, UL-DMRS-CSI, and UL-DMRS-CQI.

It should be noted that, in Embodiment 1, when monitoring the interference measurement signal strength sent by the first terminal, the second terminal may record the type of the interference measurement signal and the signal strength type in the foregoing manner.

The first terminal may report, to the first base station, a PUCCH part in an uplink control data transmission area. The PUCCH part in the uplink control data transmission area may be a PUCCH part of an existing subframe or a new subframe, and the new subframe may be referred to as a self-contained subframe or a mixed subframe. Specifically, the new subframe may include a DL control part, a DL data part, and a UL control part; or the new subframe may include a DL control part, a UL data part, and a UL control part. Similarly, the first terminal may also report a PUSCH part to the first base station. The PUSCH part may be a PUSCH part of an existing subframe or a new subframe.

When feedback is performed by using a reserved PUCCH/PUSCH, feedback that is performed for the UL-signal strength type or the UL-signal type-signal strength type needs to be specified, and a corresponding signal strength value needs to be specified, or the corresponding signal strength value is directly fed back. The reserved PUCCH/PUSCH is notified by the base station to the terminal in advance by using air interface signaling.

S608. The first base station controls, based on the interference measurement signal strength, power at which the first base station sends a data signal to the first terminal.

To control the power of the sent data signal, the first base station may also configure a correspondence between sending power (or referred to as transmit power) of the data signal and the interference measurement signal strength, and control sending power of the data signal based on the correspondence. It should be noted that the correspondence is different from a correspondence in Embodiment 1, and the correspondence is a positive correlation. In other words, if the interference measurement signal strength is higher, controlled sending power of the data signal is higher, to reduce interference suffered by the first terminal; on the contrary, if the interference measurement signal strength is lower, the controlled transmit power of the data signal is lower, to ensure that power consumption of the first base station can be reduced without causing interference to receiving of the data signal by the first terminal.

Alternatively, the first base station controls the sending power of the data signal by using relative narrowband transmission power (Relative Narrowband Transmission Power, RNTP) signaling. Specifically, the first base station controls transmit power of different PRBs by using the RNTP signaling, increases transmit power of a PRB for a time domain/frequency domain resource of a data signal corresponding to a relatively strong interference measurement signal, and reduces transmit power of a PRB for a time domain/frequency domain resource of a data signal corresponding to a relatively weak interference measurement signal. It should be noted that if only an interference measurement method is performed, step S607 and step S608 may not be mandatory steps.

In Embodiment 1, the first terminal sends the interference measurement signal, and the second terminal monitors the interference measurement signal and adaptively adjusts power. In Embodiment 2, the second terminal sends the interference measurement signal; the first terminal monitors the interference measurement signal, and feeds back the interference measurement signal to the first base station; and the first base station changes a scheduling manner, for example, adjusts power. It can be learned that the foregoing two embodiments are mainly performed on the terminal side or the first terminal. This application further provides the following embodiment. The embodiment is mainly applied to a base station side. The base station sends and monitors an interference measurement signal, and controls power based on a result that is obtained through monitoring.

Embodiment 3

Figure 7:
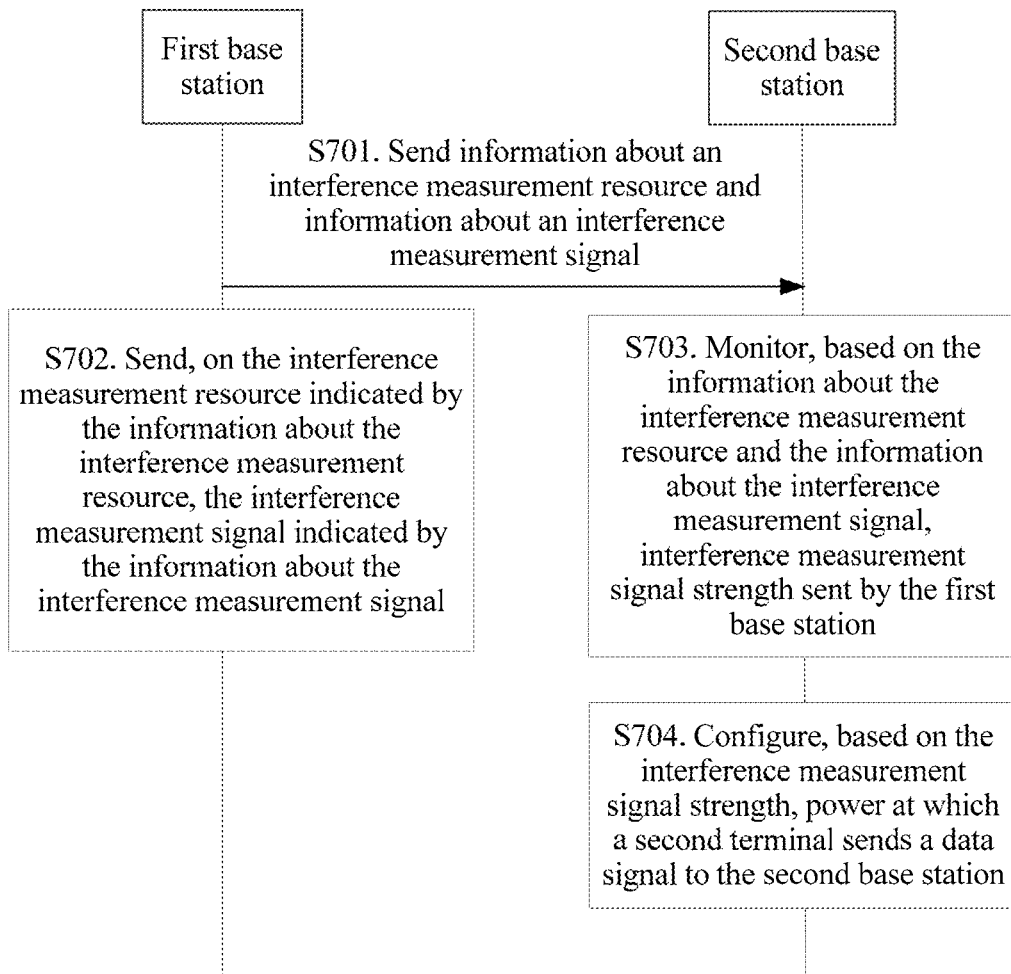
FIG. 7 is still another schematic flowchart of power control based on interference measurement according to this application.

In this embodiment, a first base station sends an interference measurement signal, and a second base station measures the interference measurement signal; and a corresponding scheduling manner and the like are adjusted on a base station side. FIG. 7 is a schematic flowchart of power control based on interference measurement. Specifically, steps S701 to S704 are included.

S701. The first base station sends information about an interference measurement resource and information about an interference measurement signal to the second base station.

The first base station may send the foregoing information to the second base station simultaneously or at different time.

It should be noted that the information about the interference measurement resource and the information about the interference measurement signal of the second base station may not be sent by the first base station, or may be configured through OAM; to be specific, the information about the interference measurement resource and/or the information about the interference measurement signal between the first base station and the second base station are/is configured through OAM.

After receiving the interference measurement resource, the second base station does not configure data transmission or data receiving on these specified resources, that is, blanks (blank) these resources, to ensure that the interference is correctly measured.

S702. The first base station sends, on the interference measurement resource indicated by the information about the interference measurement resource, the interference measurement signal indicated by the information about the interference measurement signal.

Different from the foregoing two embodiments, the interference measurement signal of the first base station is sent to the second base station.

S703. The second base station monitors, based on the information about the interference measurement resource and the information about the interference measurement signal, interference measurement signal strength sent by the first base station.

S704. The second base station configures, based on the interference measurement signal strength, power at which a second terminal sends a data signal to the second base station.

Configuring the power at which the second terminal sends the data signal to the second base station includes configuring a power parameter value and/or an MCS used by the second terminal to send the data signal to the second base station, so that during uplink transmission, the second terminal determines uplink transmit power by using the configured power parameter value and/or performs uplink transmission by using the configured MCS. It should be noted that if only an interference measurement method is performed, step S703 and step S704 may not be mandatory steps.

It can be learned from the foregoing technical solutions that, in this embodiment, a base station can implement interference measurement, and perform corresponding processing on a terminal based on measured interference strength, for example, control the power used to send the data signal to the base station. This does not increase heavy interference measurement burden of the terminal.

Based on the foregoing embodiments, the second base station may further send the interference measurement signal strength to the first base station. Therefore, the first base station may perform corresponding processing, for example, adjust power used for downlink transmission.

In addition, the first base station may send indication information of the interference measurement resource and/or indication information of the interference measurement signal to a first terminal. In this way, after receiving the indication information of the interference measurement resource, the first terminal learns that resources indicated by the indication information are used for interference measurement, and no data used by the first base station to schedule the first terminal to perform downlink transmission exists on these resources. Therefore, the first terminal may perform a corresponding data operation such as rate matching or puncturing on received data.

In addition, the second base station may send indication information of the interference measurement resource and/or the information about the interference measurement signal to the second terminal. In this way, after receiving the indication information of the interference measurement resource, the second terminal learns that resources indicated by the indication information are used for interference measurement, and no data used by the second base station to schedule the second terminal to perform uplink transmission exists on these resources. Therefore, the second terminal may perform a corresponding data operation such as rate matching or puncturing on uplink transmitted data. It should be noted that, in Embodiment 3, the first base station may be replaced with the second base station, and the second base station may be replaced with the first base station.

Figure 8:
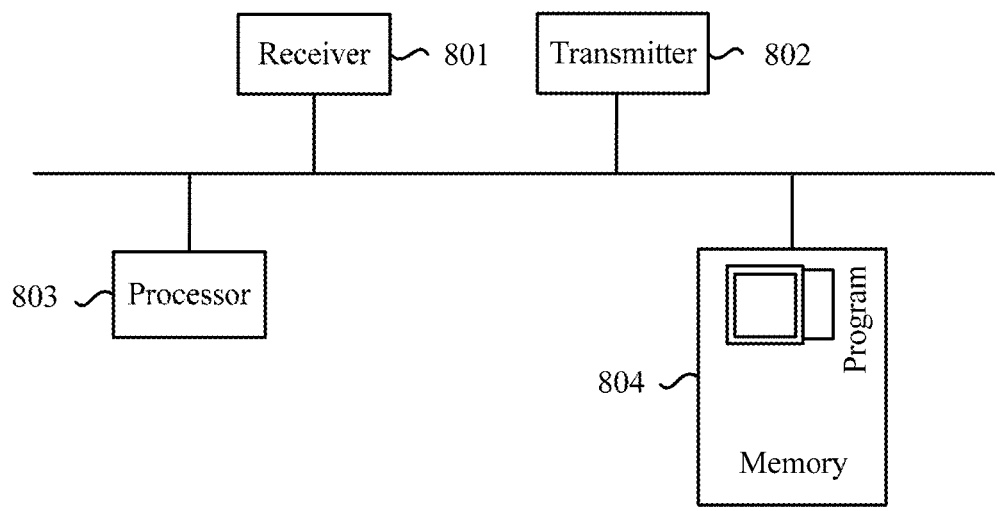
FIG. 8 is a schematic hardware structural diagram of a first terminal according to this application.

FIG. 8 is a schematic structural diagram of a first terminal according to this application. The first terminal includes a bus, a receiver 801, a transmitter 802, a processor 803, and a memory 804. The bus, the receiver 801, the transmitter 802, the processor 803, and the memory 804 are connected to each other by using the bus.

The bus may include a path for transferring information between components of the first terminal.

The receiver 801 is configured to receive indication information of an interference measurement resource and/or indication information of an interference measurement signal, where the indication information of the interference measurement resource includes at least one of a time domain location, a frequency domain location, and a space domain location for transmitting the interference measurement signal. The receiver 801 may be further configured to perform other data receiving actions related to the first terminal in Embodiment 1.

The transmitter 802 is configured to send, on the interference measurement resource indicated by the indication information of the interference measurement resource, the interference measurement signal indicated by the indication information of the interference measurement signal, where the interference measurement signal is a signal used to measure interference between links in different directions. The transmitter 802 may be further configured to perform other data sending actions related to the first terminal.

The processor 803 may coordinate operations of the receiver 801 and the transmitter 802.

The memory 804 stores a program for performing the technical solutions in this application, and may further store an operating system and other data.

Figure 9:
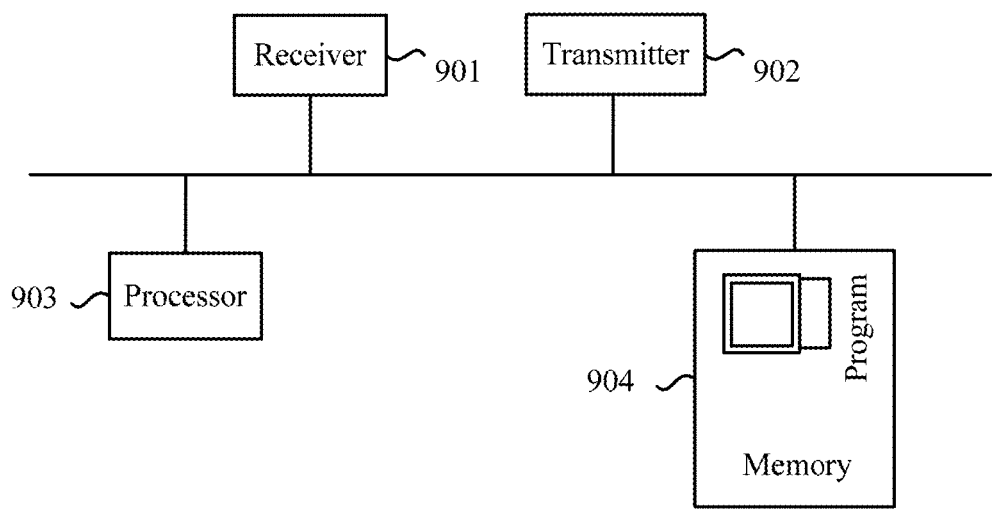
FIG. 9 is a schematic hardware structural diagram of a second terminal according to this application.

FIG. 9 is a schematic structural diagram of a second terminal according to this application. The second terminal includes a bus, a receiver 901, a transmitter 902, a processor 903, and a memory 904. The bus, the receiver 901, the transmitter 902, the processor 903, and the memory 904 are connected to each other by using the bus.

The bus may include a path for transferring information between components of the second terminal.

The receiver 901 is configured to perform a data receiving action related to the second terminal in Embodiment 1.

The transmitter 902 is configured to perform a data sending action related to the second terminal in Embodiment 1.

The processor 903 is configured to: measure, based on information about an interference measurement resource and information about an interference measurement signal, an interference measurement signal transmitted by another terminal, to obtain interference measurement signal strength, where the interference measurement signal is a signal used to measure interference between links in different directions, and the different directions include a downlink direction between the another terminal and a first network device and an uplink direction between the terminal and a second network device; and control, based on the interference measurement signal strength, power at which the terminal sends a data signal to the second network device. The processor 903 may be further configured to perform other data processing actions related to the second terminal in Embodiment 1.

The memory 904 stores a program for performing the technical solutions in this application, and may further store an operating system and other data.

Figure 10:
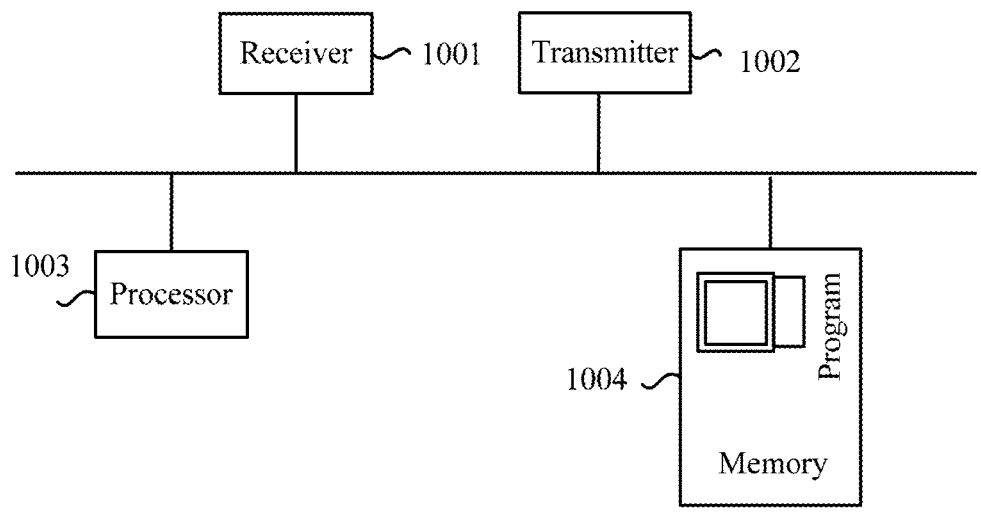
FIG. 10 is another schematic hardware structural diagram of a first terminal according to this application.

FIG. 10 is another schematic structural diagram of a first terminal according to this application. The first terminal includes a bus, a receiver 1001, a transmitter 1002, a processor 1003, and a memory 1004. The bus, the receiver 1001, the transmitter 1002, the processor 1003, and the memory 1004 are connected to each other by using the bus.

The bus may include a path for transferring information between components of the first terminal.

The receiver 1001 is configured to perform a data receiving action related to the second terminal in Embodiment 2.

The transmitter 1002 is configured to perform a data sending action related to the second terminal in Embodiment 2.

The processor 1003 is configured to measure, based on information about an interference measurement resource and information about an interference measurement signal, an interference measurement signal transmitted by another terminal, to obtain interference measurement signal strength, where the interference measurement signal is a signal used to measure interference between links in different directions, and the different directions include a downlink direction between the another terminal and a first network device and an uplink direction between the terminal and a second network device.

The memory 1004 stores a program for performing the technical solutions in this application, and may further store an operating system and other data.

Figure 11:
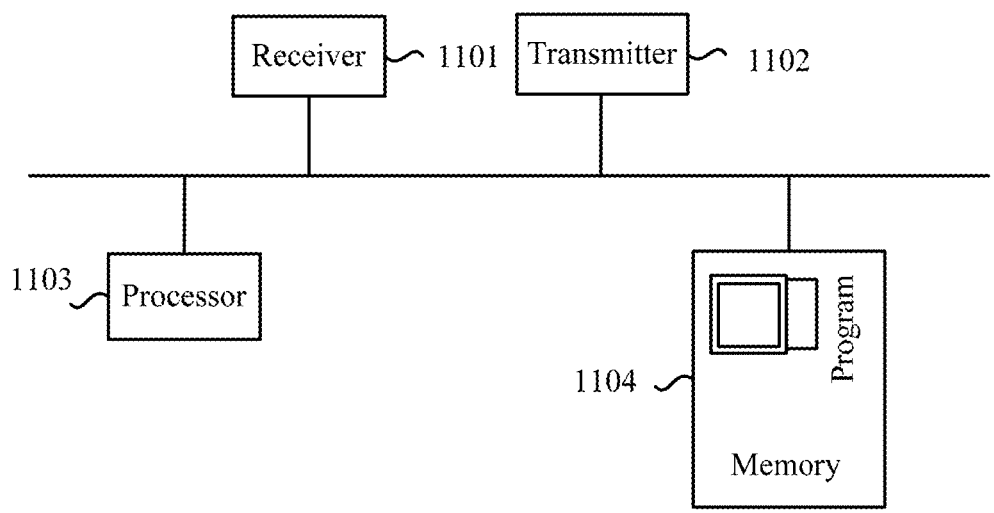
FIG. 11 is a schematic hardware structural diagram of a first base station according to this application.

FIG. 11 is a schematic structural diagram of a first base station according to this application. The first base station includes a bus, a receiver 1101, a transmitter 1102, a processor 1103, and a memory 1104. The bus, the receiver 1101, the transmitter 1102, the processor 1103, and the memory 1104 are connected to each other by using the bus.

The bus may include a path for transferring information between components of the first base station.

The receiver 1101 is configured to perform a data receiving action related to the first base station in Embodiment 3.

The transmitter 1102 is configured to send an interference measurement signal to a second base station on an interference measurement resource, where the interference measurement signal is a signal used to measure interference between links in different directions. In addition, the transmitter 1002 may perform a data sending action related to the first base station in Embodiment 3.

The processor 1103 may coordinate operations of the receiver 1101 and the transmitter 1102.

The memory 1104 stores a program for performing the technical solutions in this application, and may further store an operating system and other data.

Figure 12:
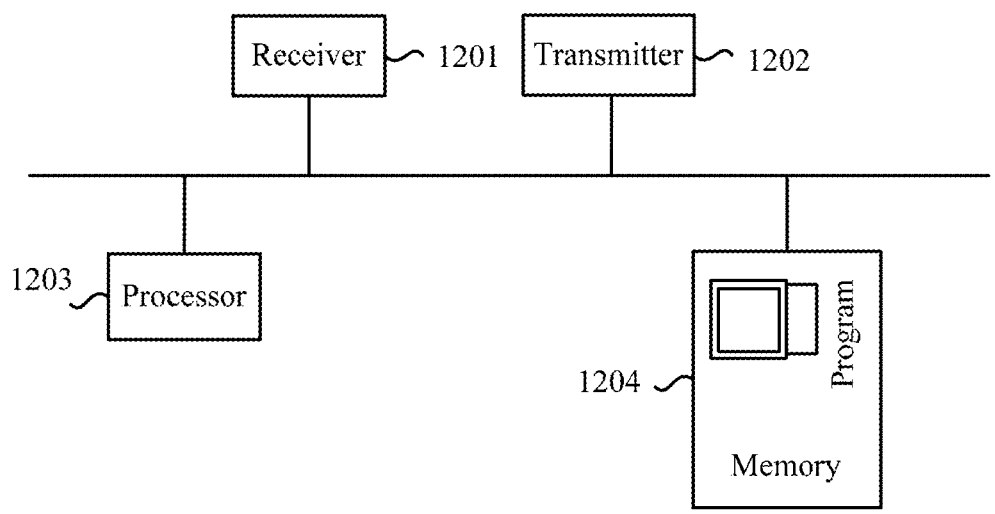
FIG. 12 is a schematic hardware structural diagram of a second base station according to this application.

FIG. 12 is a schematic structural diagram of a second base station according to this application. The second base station includes a bus, a receiver 1201, a transmitter 1202, a processor 1203, and a memory 1204. The bus, the receiver 1201, the transmitter 1202, the processor 1203, and the memory 1204 are connected to each other by using the bus.

The bus may include a path for transferring information between components of the second base station.

The receiver 1201 is configured to perform a data receiving action related to the second base station in Embodiment 3.

The transmitter 1202 is configured to perform a data sending action related to the second base station in Embodiment 3.

The processor 1203 is configured to measure, based on information about an interference measurement resource and information about an interference measurement signal, an interference measurement signal transmitted by a first base station, to obtain interference measurement signal strength.

The memory 1204 stores a program for performing the technical solutions in this application, and may further store an operating system and other data.

The following further describes application scenarios and terms in this application.

In this specification, the first base station and the second base station are interchangeable, and the first terminal and the second terminal are interchangeable. They are not limited by particular names.

The technical solutions provided in the embodiments of this application may be applied to various communications systems such as current 2G, 3G, and 4G communications systems and a future evolved network such as a 5G communications system, for example, a long term evolution (Long Term Evolution, LTE) system, a 3GPP-related cellular system, and another communications system. Particularly, the technical solutions may be applied to a 5G ultra dense network (Ultra Dense Network, UDN) system. It should be noted that a 5G standard may include scenarios such as a machine to machine (Machine to Machine, M2M) scenario, a D2M scenario, a macro-micro communication scenario, an enhanced mobile broadband (Enhance Mobile Broadband, eMBB) scenario, an ultra-reliable and low latency communications (Ultra Reliable & Low Latency Communication, uRLLC) scenario, and a massive machine type communication (Massive Machine Type Communication, mMTC) scenario. These scenarios may include but are not limited to a communication scenario between base stations, a communication scenario between a base station and a terminal, a communication scenario between terminals, and the like. The technical solutions provided in the embodiments of this application may also be applied to scenarios such as a communication scenario between a base station and a terminal, or a communication scenario between base stations, or a communication scenario between terminals in a 5G communications system.

In the foregoing embodiments, the first base station and the second base station may be, but not limited to, various types of base stations such as a base station using a 5G technology, a small-cell base station, a new radio base station (new radio eNB), or a transmission point (transmission point, TRP). Alternatively, in a wireless local area network application scenario, the first base station and the second base station may be replaced with a first wireless access point (Access Point, AP) and a second wireless access point. In another application scenario, the first base station and the second base station may be replaced with other types of devices.

The base station may be a relay station, an access point, a transmission point, or the like. The base station may be a base transceiver station (Base Transceiver Station, BTS) in a global system for mobile communications (Global System for Mobile Communication, GSM) or a code division multiple access (Code Division Multiple Access, CDMA) network, may be an NB (NodeB) in wideband code division multiple access (Wideband Code Division Multiple Access, WCDMA), or may be an eNB or an eNodeB (evolutional NodeB) in LTE. The base station may alternatively be a radio controller in a cloud radio access network (Cloud Radio Access Network, CRAN) scenario. The base station may alternatively be a network device (for example, a gNB) in a future 5G network or a network device in a future evolved public land mobile network (Public Land Mobile Network, PLMN), or may be a wearable device, a vehicular device, or the like.

The base station may include a building baseband unit (Building Baseband Unit, BBU) and a remote radio unit (Remote Radio Unit, RRU). The RRU is connected to an antenna system (to be specific, an antenna), and the BBU and the RRU may be separately used based on a requirement. It should be noted that, in a specific implementation process, the base station may alternatively have another general hardware architecture.

The terminal may be user equipment (User Equipment, UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, a vehicular device, a wearable device, a terminal in a future 5G network, or a terminal in a future evolved PLMN network.

In addition, types of neighboring cells may be a macro cell, a micro cell, a pico cell, and the like, and the types of the neighboring cells may be same or different. There may also a plurality of network types in a cell. For example, a network type may be an ultra dense network (Ultra Dense Network, UDN), and there are more cells constructed by using the network types, and a distance between cells is shorter. Therefore, there are more interference cases, and interference is stronger. In a UDN scenario, severer interference occurs not only between neighboring cell clusters, but also between neighbor small cells.

In this specification, unless otherwise specified, all sent air interface signaling may be at least one of RRC signaling, MAC layer signaling, or physical layer signaling. Alternatively, all the sent air interface signaling may be preconfigured by using RRC signaling and activated by using physical layer signaling.

In addition, this application is not limited to being applied to a low-frequency system, but may be further applied to a high-frequency millimeter-wave system. Therefore, the interference measurement signal, the interference measurement resource, and/or the power control, and/or reporting of the interference measurement signal strength and the like may all be based on beamforming (beamforming) or correspond to a beam identifier. To be specific, the interference measurement signal, the interference measurement resource, and/or the power control, and/or reporting of the interference measurement signal strength may all further carry the beam identifier. The beam identifier may be a beam index, an identifier of a corresponding synchronization signal on a beam, or an identifier of a corresponding reference signal on the beam. The identifier of the synchronization signal or the identifier of the reference signal may be a time identifier related to the synchronization signal or the reference signal, for example, a time index of a synchronization signal block.

In this application, the interference measurement signal may also be referred to as any one of an interference detection signal, an interference sensing signal, an interference monitoring signal, and an interference measurement signal. In this patent, the interference measurement resource may also be referred to as any one of an interference detection resource, an interference sensing resource, an interference monitoring resource, and an interference measurement resource.

In this application, the interference measurement signal strength may also be referred to as interference measurement signal received power or a measurement result of the interference measurement signal. In this patent, the first base station and the second base station are used as an example for description. However, a quantity of base stations is not limited to two, and actually, there may be a plurality of base stations. Therefore, based on an interference measurement signal sent by a first terminal belonging to the first base station, the second base station can configure a second terminal to perform monitoring, a third base station can configure a third terminal to perform monitoring, and so on. Similarly, based on an interference measurement signal sent by the second terminal belonging to the second base station, the first base station can configure the first terminal to perform monitoring, the third base station can configure the third terminal to perform monitoring, and so on. Similarly, when the first base station sends an interference measurement signal, both the second base station and the third base station can perform monitoring.

For ease of understanding, some concepts related to this application are described as examples for reference. Details are as follows:

Downlink: A downlink is an information transmission direction from a base station to a terminal.

Uplink: An uplink is an information transmission direction from a terminal to a base station.

Special subframe: A special subframe is a conversion subframe located between a downlink subframe and an uplink subframe.

Static configuration: Static configuration is configuration usually performed through preconfiguration or by using a network planning method.

Dynamic configuration: Dynamic configuration is a real-time configuration manner or a configuration manner with a high frequency.

Semi-static configuration: Semi-static configuration is configuration between static configuration and dynamic configuration, where a change frequency is relatively low, and configuration is usually performed by using higher layer signaling in a configuration manner with a relatively long configuration period or a configuration manner with relatively long configuration duration.

Resource particle: A resource particle is a divided resource unit.

New subframe/slot: A new subframe/slot is also referred to as a self-contained subframe/slot, a new radio subframe/slot, a bidirectional subframe/slot, or a mixed subframe/slot. A self-contained subframe/slot is used as an example below. The self-contained subframe may include a self-contained downlink subframe and a self-contained uplink subframe. The self-contained downlink subframe may include transmission of a downlink control channel, a downlink data channel, and an uplink control channel. The self-contained uplink subframe may include transmission of a downlink control channel, an uplink data channel, and an uplink control channel. The new subframe/slot may be a new mini-subframe/slot.

Resource element (Resource Element, RE): A resource element corresponds to a one subcarrier in frequency domain, and corresponds to one OFDM symbol in time domain.

Subband: A subband includes several subcarriers.

Frequency band: A frequency band is entire frequency domain bandwidth.

Slot: Seven OFDM symbols correspond to one slot.

Subframe: One subframe includes two slots.

Radio frame: One radio frame includes 10 subframes.

Super frame: One super frame includes 51 multiframes, and one multiframe includes 26 subframes.

It should be noted that, in descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

What is claimed is:

1. A method for controlling cross link interference between cells, comprising:
   sending, by a first terminal, an interference measurement signal on an interference measurement resource, wherein the interference measurement signal is a signal used to measure interference between links in different directions, and the different directions comprise a downlink direction between the first terminal and a first network device and an uplink direction between a second terminal and a second network device;
   measuring, by the second terminal, the interference measurement signal based on information about the interference measurement resource and information about the interference measurement signal, to obtain interference measurement signal strength; and
   controlling, by the second terminal based on the interference measurement signal strength, power at which the second terminal sends a data signal to the second network device, to control cross link interference between cells.

2. The method according to claim 1, further comprising:
   receiving, by the first terminal, indication information of the interference measurement resource and/or indication information of the interference measurement signal, wherein the indication information of the interference measurement resource comprises at least one of a time domain location, a frequency domain location, and a space domain location for transmitting the interference measurement signal; and
   sending, by the first terminal on the interference measurement resource indicated by the indication information of the interference measurement resource, the interference measurement signal indicated by the indication information of the interference measurement signal.

3. The method according to claim 2, further comprising:
   receiving, by the first terminal, the indication information, sent by the first network device or the second network device, of the interference measurement resource; and
   receiving, by the first terminal, the indication information, sent by the first network device or the second network device, of the interference measurement signal.

4. The method according to claim 2, further comprising:
   configuring the indication information of the interference measurement resource and/or the indication information of the interference measurement signal for the first terminal through OAM.

5. The method according to claim 2, wherein the time domain location comprises a subframe, a slot, a mini-subframe, a mini-slot, an OFDM symbol, or a resource unit fewer than one OFDM symbol.

6. The method according to claim 2, wherein the frequency domain location comprises a frequency band, a sub-band, a frequency offset, a control channel element, or a physical resource block.

7. The method according to claim 2, wherein the space domain location comprises information about a transmission port or a transmission beam, and the information about the transmission beam is an identifier related to the beam.

8. The method according to claim 2, wherein
   the time domain location is located in any one of the following subframes: a subframe comprising a PDCCH, a PDSCH, and a PUCCH, a subframe comprising a PDCCH, a PUSCH, and a PUCCH, a subframe comprising a PDCCH and a PDSCH, and a subframe comprising a PUCCH and a PUSCH.

9. The method according to claim 1, wherein the controlling, by the second terminal based on the interference measurement signal strength, power at which the second terminal sends a data signal to the second network device comprises:
   receiving, by the second terminal, a relationship between a characteristic of the interference measurement signal and a location of the data signal, wherein the location comprises at least one of a time domain location, a frequency domain location, and a space domain location;
   determining, by the second terminal, the characteristic of the interference measurement signal sent by the first terminal, and determining, based on the relationship, the location of the data signal corresponding to the interference measurement signal sent by the first terminal; and
   controlling, by the second terminal based on the interference measurement signal strength, the second terminal to control the sending power of the data signal at the determined location.

10. The method according to claim 9, wherein the receiving, by the second terminal, a relationship between a characteristic of the interference measurement signal and a location of the data signal comprises:
   receiving, by the second terminal, the relationship that is between the characteristic of the interference measurement signal and the location of the data signal and that is sent by the first network device or the second network device.

11. The method according to claim 1, wherein the controlling, by the second terminal based on the interference measurement signal strength, power at which the second terminal sends a data signal to the second network device comprises:
   determining, by the second terminal, an uplink modulation and coding scheme for the data signal based on a correspondence between the interference measurement signal strength and the uplink modulation and coding scheme; or
   determining, by the second terminal, uplink transmit power to the second network device based on a correspondence between the interference measurement signal strength and a transmit power control parameter.

12. The method according to claim 11, further comprising:
   receiving, by the second terminal, signaling sent by the second network device, wherein the signaling comprises the correspondence between the interference measurement signal strength and the uplink modulation and coding scheme and/or the correspondence between the interference measurement signal strength and the transmit power control parameter.

13. The method according to claim 12, wherein the signaling is at least one of radio resource control signaling, MAC layer signaling, or physical layer signaling.

14. The method according to claim 13, wherein the physical layer signaling is uplink grant signaling or signaling in downlink control information.

15. The method according to claim 11, wherein
   the transmit power control parameter comprises any one or more of the following: a target power value, a path loss compensation factor, a closed-loop transmit power value, and a cross-link interference parameter.

16. A method for controlling cross link interference between cells, comprising:
   receiving, by a second terminal, an interference measurement signal on an interference measurement resource, wherein the interference measurement signal is a signal used to measure interference between links in different directions, and the different directions comprise a downlink direction between a first terminal and a first network device and an uplink direction between the second terminal and a second network device;
   measuring, by the second terminal, the interference measurement signal based on information about the interference measurement resource and information about the interference measurement signal, to obtain interference measurement signal strength; and
   controlling, by the second terminal based on the interference measurement signal strength, power at which the second terminal sends a data signal to the second network device, to control cross link interference between cells.

17. A terminal, comprising:
   a processor, configured to: measure, based on information about an interference measurement resource and information about an interference measurement signal, an interference measurement signal transmitted by another terminal, to obtain interference measurement signal strength, wherein the interference measurement signal is a signal used to measure interference between links in different directions, and the different directions comprise a downlink direction between the other terminal and a first network device and an uplink direction between the terminal and a second network device; and control, based on the interference measurement signal strength, power at which the terminal sends a data signal to the second network device.

18. The terminal according to claim 17, further comprising:
   a receiver, configured to receive a relationship between a characteristic of the interference measurement signal and a location of the data signal, wherein the location comprises at least one of a time domain location, a frequency domain location, and a space domain location; wherein
   that the processor is configured to control, based on the interference measurement signal strength, the power at which the terminal sends the data signal to the second network device comprises:
   the processor is configured to: determine the characteristic of the interference measurement signal sent by a first terminal; determine, based on the relationship, the location of the data signal corresponding to the interference measurement signal sent by the first terminal; and control, based on the interference measurement signal strength, the sending power of the data signal at the determined location.

19. The terminal according to claim 17, wherein that the processor is configured to control, based on the interference measurement signal strength, the power at which the terminal sends the data signal to the second network device comprises:
   the processor is configured to: determine an uplink modulation and coding scheme for the data signal based on a correspondence between the interference measurement signal strength and the uplink modulation and coding scheme; or determine uplink transmit power to the second network device based on a correspondence between the interference measurement signal strength and a transmit power control parameter.

20. The terminal according to claim 19, further comprising:
   a receiver, configured to receive signaling sent by the second network device, wherein the signaling comprises the correspondence between the interference measurement signal strength and the uplink modulation and coding scheme and/or the correspondence between the interference measurement signal strength and the transmit power control parameter.

* * * * *

UNITED STATES PATENT AND TRADEMARK OFFICE
CERTIFICATE OF CORRECTION

PATENT NO. : 11,284,355 B2
APPLICATION NO. : 16/496490
DATED : March 22, 2022
INVENTOR(S) : Lili Zhang Page 1 of 1

It is certified that error appears in the above-identified patent and that said Letters Patent is hereby corrected as shown below:

On the Title Page

On the page 2, in Column 2, Item (56) under "Other Publications", Line 8, delete "WG 1 Meeting 86BIS," and insert -- WG1 Meeting #86bis, --.

In the Specification

In Column 1, Lines 13-18, below "This application is a national stage of the International application No. PCT/CN2017/083151, filed on May 5, 2017, which claims priority to Chinese Patent Application No. 201710182073.0, filed on Mar. 24, 2017. Both of the aforementioned applications are hereby incorporated by reference in their entireties." delete "This application claims priority to Chinese Patent Application No. 201710182073.0, filed with the Chinese Patent Office on Mar. 24, 2017 and entitled "NETWORK RESOURCE CONFIGURATION METHOD AND DEVICE", which is incorporated herein by reference in its entirety.".

In Column 20, Line 16, delete "control" and insert -- control, --.

Signed and Sealed this
Fifth Day of July, 2022

Katherine Kelly Vidal
*Director of the United States Patent and Trademark Office*